US010564002B2

(12) United States Patent
Hoffman et al.

(10) Patent No.: US 10,564,002 B2
(45) Date of Patent: Feb. 18, 2020

(54) GPS FEATURES AND FUNCTIONALITY IN AN ATHLETIC WATCH SYSTEM

(71) Applicant: NIKE, Inc., Beaverton, OR (US)

(72) Inventors: Michael T. Hoffman, Portland, OR (US); Miles W. Brown, West Linn, OR (US); Aaron B. Weast, Portland, OR (US); Matt Capozzi, Portland, OR (US); Tomislav Lakovic, Portland, OR (US); James Molyneux, Portland, OR (US); Jamian R. Cobbett, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/609,979

(22) Filed: May 31, 2017

(65) Prior Publication Data

US 2017/0261335 A1   Sep. 14, 2017

Related U.S. Application Data

(63) Continuation of application No. 14/816,627, filed on Aug. 3, 2015, which is a continuation of application (Continued)

(51) Int. Cl.
*G01C 22/00* (2006.01)
*A63B 71/06* (2006.01)
(Continued)

(52) U.S. Cl.
CPC ........ *G01C 22/006* (2013.01); *A63B 24/0062* (2013.01); *A63B 71/0622* (2013.01);
(Continued)

(58) Field of Classification Search
CPC .................................................. G01C 22/006
See application file for complete search history.

(56) References Cited

U.S. PATENT DOCUMENTS 3,983,483 A    9/1976  Pando
5,054,474 A   10/1991  Jacob et al.
(Continued)

FOREIGN PATENT DOCUMENTS

CA    2815224 A1    5/2013
CH     681267      2/1993
(Continued)

OTHER PUBLICATIONS

Garmin: "Forerunner 405CX owner's manual" [online] Mar. 2009, Retrieved from the Internet: URL:http://www8.garmin.com/manuals/Forerunner405CX_OwnersManual.pdf, retrieved Jul. 7, 2010.
(Continued)

*Primary Examiner* — Yu-Hsi D Sun
(74) *Attorney, Agent, or Firm* — Banner & Witcoff, Ltd.

(57) ABSTRACT

Athletic performance monitoring systems include GPS data to enhance various features of the workout as well as the post-workout data analysis. Such features include using output from multiple sensors to determine the most accurate data available for providing distance measurements for individual segments of a route. The most accurate data for each route segment, from whatever source, then is used to provide the overall route distance and as the basis for making other calculations, such as pace, calorie burn, etc. Another feature relates to the ability to both input and output geographically tagged messages while moving along a route during an athletic performance.

20 Claims, 22 Drawing Sheets

Related U.S. Application Data

No. 12/767,447, filed on Apr. 26, 2010, now Pat. No. 9,122,250.

(60) Provisional application No. 61/172,769, filed on Apr. 26, 2009.

(51) Int. Cl.

| | | |
|---|---|---|
| *G04F 10/00* | (2006.01) | |
| *G04G 17/04* | (2006.01) | |
| *G04G 21/02* | (2010.01) | |
| *G07C 1/22* | (2006.01) | |
| *G04G 21/00* | (2010.01) | |
| *G04G 21/08* | (2010.01) | |
| *G01S 19/19* | (2010.01) | |
| *A63B 24/00* | (2006.01) | |
| *G04G 9/00* | (2006.01) | |
| *G06F 13/42* | (2006.01) | |
| *H01R 24/64* | (2011.01) | |
| *H01R 107/00* | (2006.01) | |

(52) U.S. Cl.
CPC .......... *A63B 71/0686* (2013.01); *G01S 19/19* (2013.01); *G04F 10/00* (2013.01); *G04G 9/007* (2013.01); *G04G 17/04* (2013.01); *G04G 17/045* (2013.01); *G04G 21/00* (2013.01); *G04G 21/02* (2013.01); *G04G 21/025* (2013.01); *G04G 21/08* (2013.01); *G06F 13/4282* (2013.01); *G07C 1/22* (2013.01); *H01R 24/64* (2013.01); *A63B 2071/0663* (2013.01); *A63B 2220/20* (2013.01); *A63B 2220/30* (2013.01); *A63B 2220/40* (2013.01); *A63B 2220/62* (2013.01); *A63B 2225/50* (2013.01); *G04G 9/0064* (2013.01); *H01R 2107/00* (2013.01)

(56) References Cited

U.S. PATENT DOCUMENTS

| | | | |
|---|---|---|---|
| 5,244,134 | A | 9/1993 | Riley |
| 5,361,241 | A | 11/1994 | Ferrara et al. |
| 5,504,474 | A | 4/1996 | Libman et al. |
| 5,504,747 | A | 4/1996 | Sweazey |
| 5,615,719 | A | 4/1997 | Balon |
| 5,699,082 | A | 12/1997 | Marks et al. |
| 5,732,200 | A | 3/1998 | Becker et al. |
| 5,762,241 | A | 6/1998 | Cross |
| 5,769,290 | A | 6/1998 | Pestana |
| 5,872,924 | A | 2/1999 | Nakayama et al. |
| 5,889,737 | A | 3/1999 | Alameh et al. |
| 5,946,274 | A | 8/1999 | Yamaguchi et al. |
| 6,013,008 | A | 1/2000 | Fukushima |
| 6,032,108 | A | 2/2000 | Seiple et al. |
| 6,192,253 | B1 | 2/2001 | Charlier et al. |
| 6,212,414 | B1 | 4/2001 | Alameh et al. |
| 6,222,484 | B1 | 4/2001 | Seiple et al. |
| 6,411,965 | B2 | 6/2002 | Klug |
| 6,536,941 | B1 | 3/2003 | Fang |
| 6,614,451 | B1 | 9/2003 | Hudson et al. |
| 6,736,759 | B1 | 5/2004 | Stubbs et al. |
| 6,767,218 | B2 | 7/2004 | Marmaropoulos |
| 6,837,827 | B1 | 1/2005 | Lee et al. |
| 6,874,931 | B2 | 4/2005 | Noirjean et al. |
| 7,016,263 | B2 | 3/2006 | Gueissaz et al. |
| 7,057,551 | B1 | 6/2006 | Vogt |
| 7,062,722 | B1 | 6/2006 | Carlin et al. |
| 7,173,604 | B2 | 2/2007 | Marvit et al. |
| 7,196,702 | B1 | 3/2007 | Lee et al. |
| D545,220 | S | 6/2007 | Leung |
| 7,254,516 | B2 * | 8/2007 | Case, Jr. ............. A63B 24/00 702/142 |
| D564,367 | S | 3/2008 | Molyneux |
| 7,345,954 | B2 | 3/2008 | Ehrsam et al. |
| 7,398,151 | B1 | 7/2008 | Burrell et al. |
| 7,437,321 | B2 | 10/2008 | Hanechak |
| 7,484,183 | B2 | 1/2009 | Look et al. |
| 7,510,508 | B2 | 3/2009 | Santomassimo et al. |
| 7,529,155 | B2 | 5/2009 | Fasciano |
| 7,603,255 | B2 | 10/2009 | Case, Jr. et al. |
| 7,618,260 | B2 | 11/2009 | Daniel et al. |
| 7,670,263 | B2 | 3/2010 | Ellis et al. |
| 7,717,827 | B2 | 5/2010 | Kurunmaki et al. |
| 7,771,320 | B2 | 8/2010 | Riley et al. |
| 7,789,802 | B2 | 9/2010 | Lee et al. |
| 7,828,697 | B1 | 11/2010 | Oberrieder et al. |
| 7,843,769 | B2 | 11/2010 | Ishida et al. |
| 8,040,758 | B1 | 10/2011 | Dickinson |
| 8,086,421 | B2 | 12/2011 | Case, Jr. et al. |
| 8,088,044 | B2 | 1/2012 | Tchao et al. |
| 8,112,251 | B2 | 2/2012 | Case, Jr. et al. |
| 8,152,693 | B2 | 4/2012 | Nurmela et al. |
| 8,341,557 | B2 | 12/2012 | Pisula et al. |
| 8,512,211 | B2 | 8/2013 | Rattler et al. |
| 8,771,148 | B2 | 7/2014 | Balakrishnan et al. |
| 8,771,157 | B2 | 7/2014 | Caponigro |
| 8,944,959 | B2 | 2/2015 | Chapa, Jr. et al. |
| 8,968,156 | B2 | 3/2015 | Ellis et al. |
| 9,233,269 | B2 | 1/2016 | Spoeth et al. |
| 9,278,256 | B2 | 3/2016 | Tchao et al. |
| 9,604,102 | B2 | 3/2017 | Spoeth, Jr. et al. |
| 9,618,527 | B2 | 4/2017 | McGown |
| 9,643,052 | B2 | 5/2017 | Tchao et al. |
| 2001/0043514 | A1 | 11/2001 | Kita |
| 2002/0040332 | A1 | 4/2002 | Maari et al. |
| 2002/0055419 | A1 | 5/2002 | Hinnebusch |
| 2002/0186621 | A1 | 12/2002 | Lai |
| 2003/0043203 | A1 | 3/2003 | Dye et al. |
| 2003/0059071 | A1 | 3/2003 | Dunham |
| 2003/0177187 | A1 | 9/2003 | Levine et al. |
| 2004/0081025 | A1 | 4/2004 | Chen |
| 2004/0151071 | A1 | 8/2004 | Kocher |
| 2005/0007885 | A1 | 1/2005 | Gilmour |
| 2005/0021599 | A1 | 1/2005 | Peters |
| 2005/0033515 | A1 | 2/2005 | Bozzone |
| 2005/0071242 | A1 | 3/2005 | Allen et al. |
| 2005/0209051 | A1 | 9/2005 | Santomassimo et al. |
| 2005/0212911 | A1 | 9/2005 | Marvit et al. |
| 2005/0251462 | A1 | 11/2005 | Nykamp |
| 2006/0041503 | A1 | 2/2006 | Blair et al. |
| 2006/0107235 | A1 | 5/2006 | Esaki et al. |
| 2006/0136173 | A1 | 6/2006 | Case et al. |
| 2006/0250418 | A1 | 11/2006 | Chartier et al. |
| 2006/0261958 | A1 | 11/2006 | Klein |
| 2007/0033069 | A1 | 2/2007 | Rao et al. |
| 2007/0091730 | A1 | 4/2007 | Ting |
| 2007/0213955 | A1 | 9/2007 | Ishida et al. |
| 2007/0246494 | A1 | 10/2007 | Kim et al. |
| 2007/0247306 | A1 | 10/2007 | Case |
| 2007/0260482 | A1 | 11/2007 | Nurmela et al. |
| 2007/0279852 | A1 | 12/2007 | Daniel et al. |
| 2007/0287596 | A1 | 12/2007 | Case et al. |
| 2007/0294626 | A1 | 12/2007 | Fletcher et al. |
| 2008/0077620 | A1 * | 3/2008 | Gilley ............. G06F 19/3418 |
| 2008/0096726 | A1 | 4/2008 | Riley et al. |
| 2008/0177641 | A1 | 7/2008 | Herniak et al. |
| 2008/0188969 | A1 | 8/2008 | O'Malley et al. |
| 2008/0200312 | A1 | 8/2008 | Tagliabue |
| 2008/0204225 | A1 | 8/2008 | Kitchen |
| 2008/0270248 | A1 | 10/2008 | Brill |
| 2009/0018456 | A1 | 1/2009 | Hung |
| 2009/0047645 | A1 | 2/2009 | Dibenedetto et al. |
| 2009/0048070 | A1 | 2/2009 | Vincent et al. |
| 2009/0069156 | A1 | 3/2009 | Kurunmaki et al. |
| 2009/0204906 | A1 | 8/2009 | Irving |
| 2009/0212941 | A1 | 8/2009 | Vock et al. |
| 2009/0280861 | A1 | 11/2009 | Khan |
| 2009/0319230 | A1 | 12/2009 | Case, Jr. et al. |
| 2010/0060586 | A1 | 3/2010 | Pisula et al. |
| 2010/0185547 | A1 | 7/2010 | Scholar |
| 2010/0210421 | A1 | 8/2010 | Case, Jr. et al. |

(56) References Cited

U.S. PATENT DOCUMENTS

| | | |
|---|---|---|
| 2010/0305480 A1 | 12/2010 | Fu et al. |
| 2011/0003665 A1 | 1/2011 | Burton et al. |
| 2011/0165998 A1 | 7/2011 | Lau et al. |
| 2011/0281687 A1 | 11/2011 | Gilley et al. |
| 2012/0078396 A1 | 3/2012 | Case, Jr. et al. |
| 2012/0287058 A1 | 11/2012 | Lee |

FOREIGN PATENT DOCUMENTS

| | | |
|---|---|---|
| CN | 1424861 A | 6/2003 |
| CN | 1655097 A | 8/2005 |
| CN | 2752825 Y | 1/2006 |
| CN | 1813237 A | 8/2006 |
| CN | 101111743 A | 1/2008 |
| CN | 101287215 A | 10/2008 |
| CN | 101329600 A | 12/2008 |
| CN | 101388708 A | 3/2009 |
| EP | 0631341 A1 | 12/1994 |
| EP | 669664 A1 | 8/1995 |
| EP | 700661 A2 | 3/1996 |
| EP | 1033636 A1 | 9/2000 |
| EP | 1833103 A1 | 9/2007 |
| EP | 2025369 A2 | 2/2009 |
| EP | 2026085 A2 | 2/2009 |
| GB | 2424084 A | 9/2006 |
| JP | 04184528 | 7/1992 |
| JP | H08126632 A | 5/1996 |
| JP | 08305663 | 11/1996 |
| JP | H11178798 A | 7/1999 |
| JP | H11331234 A | 11/1999 |
| JP | 2000300711 A | 10/2000 |
| JP | 2000352519 A | 12/2000 |
| JP | 2001289975 A | 10/2001 |
| JP | 2002022859 A | 1/2002 |
| JP | 2002507734 A | 3/2002 |
| JP | 2002109301 | 4/2002 |
| JP | 2002168938 A | 6/2002 |
| JP | 2002300632 A | 10/2002 |
| JP | 2002306660 A | 10/2002 |
| JP | 200322960 | 4/2003 |
| JP | 2003236028 A | 8/2003 |
| JP | 3098803 U | 10/2003 |
| JP | 2003296615 | 10/2003 |
| JP | 2004000660 A | 1/2004 |
| JP | 2004081745 A | 3/2004 |
| JP | 2004118274 | 4/2004 |
| JP | 2004348455 A | 12/2004 |
| JP | 2005069767 A | 3/2005 |
| JP | 2005300464 A | 10/2005 |
| JP | 2005321964 A | 11/2005 |
| JP | 2005332118 A | 12/2005 |
| JP | 2006058806 A | 3/2006 |
| JP | 2006146516 A | 6/2006 |
| JP | 2007042191 A | 2/2007 |
| JP | 2007117591 A | 5/2007 |
| JP | 2007514235 | 5/2007 |
| JP | 2007148617 A | 6/2007 |
| JP | 2007248271 A | 9/2007 |
| JP | 2007267996 | 10/2007 |
| JP | 2008048757 A | 3/2008 |
| JP | 2008101996 A | 5/2008 |
| JP | 2008524589 A | 7/2008 |
| JP | 2008529559 A | 8/2008 |
| JP | 2008211361 A | 9/2008 |
| JP | 2008270901 A | 11/2008 |
| JP | 2009050699 A | 3/2009 |
| JP | 2009078134 A | 4/2009 |
| JP | 2009216484 A | 9/2009 |
| JP | 2010192012 A | 9/2010 |
| JP | 2010223594 A | 10/2010 |
| JP | 2010249578 A | 11/2010 |
| JP | 2010264246 A | 11/2010 |
| JP | 2010272159 A | 12/2010 |
| JP | 2011027500 A | 2/2011 |
| JP | 2011038988 A | 2/2011 |
| JP | 2011516174 A | 5/2011 |
| JP | 2011122996 A | 6/2011 |
| KR | 20030039970 A | 5/2003 |
| KR | 20050032587 A | 4/2005 |
| KR | 100724887 B1 | 5/2007 |
| KR | 20080022680 | 3/2008 |
| KR | 20090029695 | 3/2009 |
| WO | 0142809 A2 | 6/2001 |
| WO | 2002097705 | 12/2002 |
| WO | 2004100059 A2 | 11/2004 |
| WO | 2005062158 | 7/2005 |
| WO | 2006065679 A2 | 6/2006 |
| WO | 2007069127 A2 | 6/2007 |
| WO | 2007083314 A2 | 7/2007 |
| WO | 2007135389 A1 | 11/2007 |
| WO | 2008050590 A1 | 5/2008 |
| WO | 2008056524 A1 | 5/2008 |
| WO | 2008101085 A2 | 8/2008 |
| WO | 2008142477 A1 | 11/2008 |
| WO | 2009030484 A1 | 3/2009 |
| WO | 2009033034 A1 | 3/2009 |
| WO | 2009124193 A1 | 10/2009 |
| WO | 2010073057 A1 | 7/2010 |
| WO | 2010126821 A1 | 11/2010 |

OTHER PUBLICATIONS

Garmin: "Foot Pod" [online] Oct. 2008, Retrieved from the Internet: URL: http:f/wwwB.garmin.com/manuals/FootPod_Instructions_ Multilingual_.pdf, retrieved Jul. 7, 2010.
Oct. 1, 2010—(WO) ISR and WO—App. No. PCT/US2010/ 032381.
Jul. 16, 2010—(WO) ISR and WO—App. No. PCT/US2010/ 032391.
Jul. 14, 2010—(WO) ISR and WO—App. No. PCT/US2010/ 032401.
Jun. 11, 2013—(WO) ISR and WO—App. No. PCT/US2012/ 071700.
Aug. 7, 2013—(WO) ISR and WO—App. No. PCT/US2013/ 027262.
Apr. 25, 2012—(WO) ISR—App. No. PCT/US10/35179.
Feb. 26, 2014—(EP) ESR—App. No. 10726358.4.
Mar. 27, 2013—(EP) Search Report—Application No. 13151122.2.
Nov. 10, 2011—(WO) IPRP—App. No. PCT/US101/032381.
Jun. 1, 2015—(EP) EESR—App. No. 15151599.6.
May 2, 2016—(EP) Partial European Search Report—App 14193759. 9.
Sep. 8, 2016—(EP) Extended Search Report—App. No. 14193759. 9.

* cited by examiner

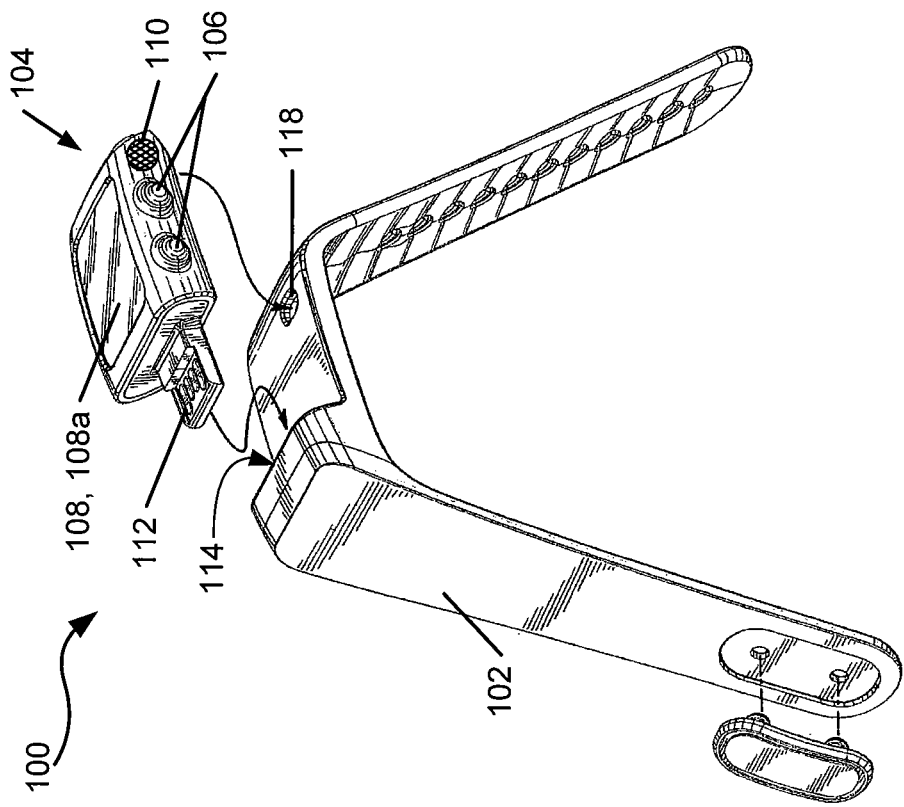
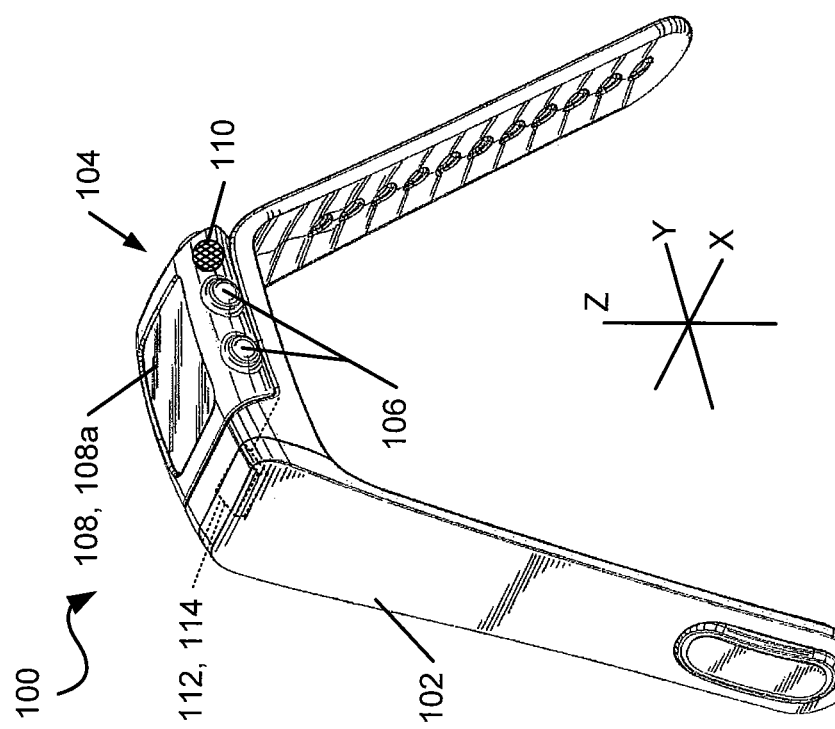

_US 10,564,002 B2_

GPS FEATURES AND FUNCTIONALITY IN AN ATHLETIC WATCH SYSTEM

RELATED APPLICATIONS

This application is a continuation of U.S. application Ser. No. 14/816,627, filed Aug. 3, 2015, which is a continuation of U.S. application Ser. No. 12/767,447 filed Apr. 26, 2010, now U.S. Pat. No. 9,122,250, which claims the benefit of and priority to U.S. Provisional Patent Appln. No. 61/172,769 filed Apr. 26, 2009. These earlier patent applications are incorporated herein by reference in their entireties for any and all non-limiting purposes.

TECHNICAL FIELD

The present invention generally relates to athletic performance monitoring systems and, more particularly, to athletic performance monitoring systems including a portable/wearable component and having various global positioning system ("GPS") features and functionality and enhanced athletic performance features and functionality.

BACKGROUND OF THE INVENTION

Devices, such as watches and, in particular, watches having features allowing a wearer to monitor athletic performance, are known. For example, runners often wear watches to keep track of time, distance, pace, laps, etc. Such watches, however, are oftentimes not user friendly and may be cumbersome to use. Consequently, the wearer may not utilize the watch to its full potential. Such watches also have limited athletic performance monitoring capabilities. Accordingly, while certain watches having athletic functionality provide a number of advantageous features, they nevertheless have certain limitations. The present invention seeks to overcome certain of these limitations and other drawbacks of the prior art and to provide new features not heretofore available.

SUMMARY OF THE INVENTION

As noted above, the present invention generally relates to athletic performance monitoring systems including a portable/wearable component (such as a watch, an MP3 player, or the like) and having various GPS features and functionality and enhanced athletic features and functionality.

One aspect of this invention relates to systems for monitoring athletic performances. Such systems may include, for example: an input system (e.g., wired or wireless input ports, antennae, etc.) for receiving: (a) a first type of input data (e.g., pedometer data, speedometer data, odometer data, etc.) indicative of an athlete's movement distance during an athletic performance over at least a first portion of a route and (b) a second type of input data (e.g., GPS data) indicative of the athlete's movement distance during the same athletic performance over at least the first portion of the route, wherein the first type of input data is generated by a first sensor system that is independent from a second sensor system that generates the second type of input data. The athletic performance monitoring systems further include a processing system (e.g., one or more microprocessors) programmed and adapted for: (a) determining whether the first type of input data or the second type of input data is likely more accurate for the first portion of the route and (b) determining at least one of overall movement distance during the athletic performance, movement distance over the first portion of the route, overall pace during the athletic performance, pace over the first portion of the route, overall calorie burn during the athletic performance, or calorie burn over the first portion of the route using the type of input data determined to be more accurate over the first portion of the route. In this manner, the most reliable data for each portion or segment of a route may be used to provide the most overall accurate possible movement distance information for making various calculations (and one sensor may provide the data for some portions or segments of the route and the other sensor may provide the data for other portions or segments of the route). The system may be contained within a portable electronic device carried by the athlete during the performance, such as a wrist borne device, like a watch.

Systems according to at least some examples of this invention may receive data from other sources that may help in determining which type of data is likely more accurate. As one more specific example, data indicative of acceleration changes over at least the first portion of the route (from an accelerometer) might be useful in determining whether the user has made a turn (and thus in determining whether the GPS data remains accurate). As another example, input data indicative of GPS signal strength or GPS reliability over at least the first portion of the route may be considered in determining which input data stream is more accurate for that portion of the route. In some instances the determination of which data stream is more accurate may be determined, at least in part, by comparing the content of the two data streams (e.g., comparing the GPS and pedometer data), optionally along with other data, such as accelerometer data, map data, signal strength data, battery strength data, foot contact pressure profile data, foot contact angle data, etc.

Additional aspects of this invention relate to methods for monitoring athletic performances. Such methods may include, for example: (a) receiving input data from a first sensor system (e.g., a pedometer, speedometer, odometer, or other distance measuring sensor) indicative of an athlete's movement distance during an athletic performance over at least a first portion of a route; (b) receiving input data from a second sensor system (e.g., a GPS system) indicative of the athlete's movement distance during the same athletic performance over at least the first portion of the route, wherein the second sensor system is independent from the first sensor system; (c) determining whether the input data from the first sensor system or the input data from the second sensor system is likely more accurate for the first portion of the route; and (d) determining at least one of overall movement distance during the athletic performance, movement distance over the first portion of the route, overall pace during the athletic performance, pace over the first portion of the route, overall calorie burn during the athletic performance, or calorie burn over the first portion of the route using the input data determined to be more accurate for the first portion of the route. These methods may include any of the various features for the systems described above.

Additional aspects of this invention relate to athletic performance monitoring systems that may include, for example: an input system (e.g., one or more wired or wireless input ports, antennae, etc.) for receiving: (a) a first type of input data indicative of an athlete's location on a route (e.g., GPS data) as the athlete moves along the route during an athletic performance, (b) a second type of input data indicative of a message trigger location (e.g., geographic coordinates, GPS coordinates, map coordinates, etc.), and (c) a third type of input data including a message payload (e.g., textual, audio, graphical, and/or video data; an audio message arrival indicator; a tactile message arrival indicator; etc.), wherein the second type of input data and the third type of input data are received through a computing device temporarily connected to the input system for data exchange. Such systems further may include a processing system (e.g., one or more microprocessors) programmed and adapted to: (a) compare the first type of input data indicative of the athlete's location on the route and the second type of input data indicative of the message trigger location, and (b) deliver the message payload when the first type of input data indicates that the athlete is or has been physically present at the message trigger location, wherein the compare and deliver steps are accomplished when the computing device is not connected to the input system and while the athlete is at or in close proximity to the message trigger location. In this manner, non-network connected devices carried by users during an athletic performance can interact with the user in a manner in which it appears that there is a live networked connection.

Such systems may have further sensors to assure that the message payload is delivered on under certain conditions, such as under conditions in which the athlete reached the geographic trigger location as a result of a workout. This may be accomplished, for example, by including a speed or distance sensor operatively coupled to the input system to provide input data indicative of the athlete's movement speed or movement distance on the route. This input data may be provided, for example, by a pedometer, by GPS, by an accelerometer, by a speedometer, by an odometer, etc. As some more specific examples, systems according to at least some examples of this invention may be programmed and adapted to deliver the message payload only if pedometer or speedometer data indicates that the athlete reached the location on foot or on a bicycle (e.g., by requiring a threshold movement distance as indicated by a pedometer or odometer before the location was reached or by requiring that the athlete approach the location within a predetermined speed range to indicate movement on foot or bicycle, etc.).

Additional aspects of this invention may include methods of monitoring athletic performances, including, for example: (a) operably connecting a portable electronic device to a computing device for data exchange; (b) receiving input data indicative of a message trigger location on the portable electronic device from the computing device; (c) receiving input data including a message payload on the portable electronic device from the computing device; (d) terminating the connection between the portable electronic device and the computing device; (e) receiving input data on the portable electronic device indicative of the athlete's location on a route as the athlete moves along the route during an athletic performance and while there is no operable data exchange connection between the portable electronic device and the computing device; (f) comparing the input data indicative of the athlete's location on the route and the input data indicative of the message trigger location while there is no operable data exchange connection between the portable electronic device and the computing device; and (g) delivering the message payload when the input data indicates that the athlete is or has been physically present at the message trigger location while there is no operable data exchange connection between the portable electronic device and the computing device. These methods may include any of the various features for the systems described above.

Other features and advantages of the invention will be apparent from the following examples in the specification taken in conjunction with the following drawings.

BRIEF DESCRIPTION OF THE DRAWINGS

The reader is advised that the drawings included with this application are generally schematic and illustrate examples of various features of this invention. The various features in the drawings also are necessarily drawn to scale.

FIGS. 1A through 1C illustrate various views of an example watch device that may have some or all of the example features, functionality, and aspects of this invention;

DETAILED DESCRIPTION

Figure 1C:
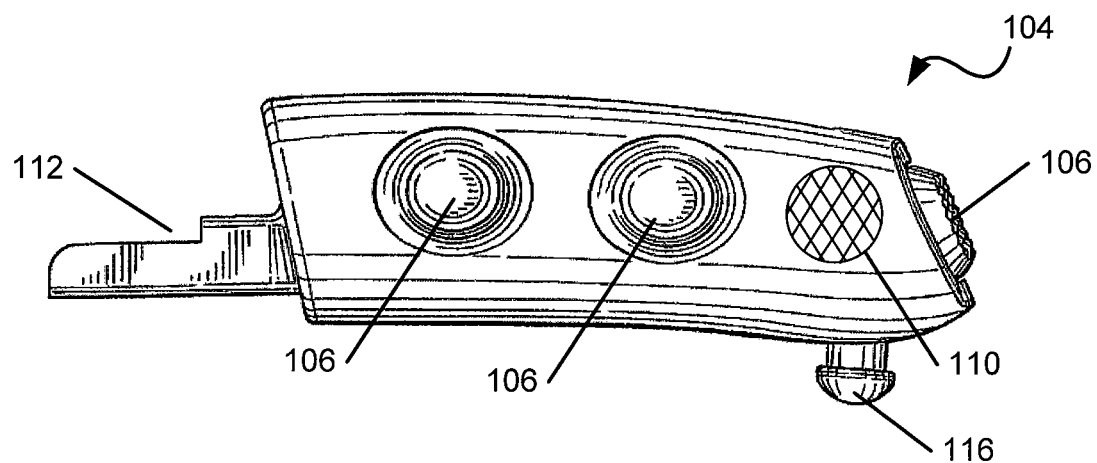

While this invention is susceptible of embodiment in many different forms, there are shown in the drawings, and will herein be described in detail, preferred embodiments of the invention with the understanding that the present disclosure is to be considered as an exemplification of the principles of the invention and is not intended to limit the broad aspects of the invention to the embodiments illustrated and described.

Device Structure

FIGS. 1A through 1C illustrate an example watch structure 100 that may be used in accordance with at least some aspects of this invention. The watch 100 includes a band structure 102 for securing to the user's wrist and a removable electronic module 104 for performing various functions, such as those described in more detail below.

The electronic module 104 may include one or more input devices for receiving user input and input from other sources (such as pedometer data, GPS data, heart rate monitor data, etc.). For user input, the module 104 may include one or more hard buttons 106 that enable the user to interact with and change information provided on the display screen 108 of the electronic module 104, e.g., as will be described in more detail below. Other input devices may include, for example, input ports for hardware (e.g., a USB port), a microphone (110) for audio input, wireless receivers for wireless input, antennae, etc. Any desired types of input devices, input hardware, software, and/or communications protocols may be used without departing from this invention, including conventional input devices, input hardware, software, and/or communications protocols.

In addition to hard buttons 106 that allow user input along the X-axis (side-to-side axis) and the Y-axis (top-to-bottom) of the module 104, electronic modules 104 in accordance with at least some examples of this invention may include the capability to receive input by pushing downward (or "tapping") on the outer surface of the display 108 in the Z-axis direction. The ability to enter input by tapping the display 108 (and pushing it downward) can be particularly useful for interacting with the module 104 and the user interface 108a provided thereby when a user is involved in athletic activity, such as running or the like, because the action is very quick and easy and can be carried out with little or no diversion of the user's attention from the performance. More specific examples of watch structures having these types of tri-axis input button features are described, for example, in the patent applications mentioned in the "Related Applications" Section above.

Figure 2:
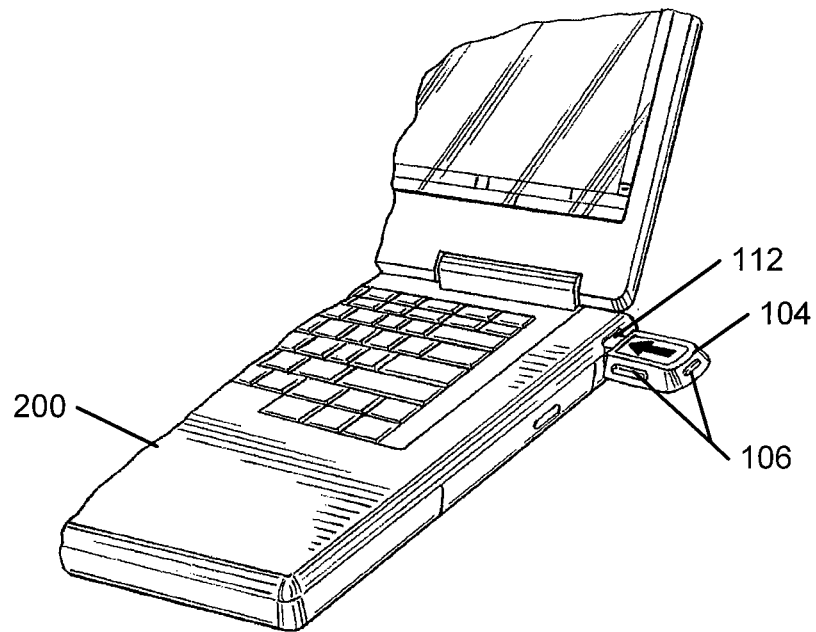
FIG. 2 illustrates an example of a connection of a data collection device of the watch of FIGS. 1A through 1C to a computing device for data download and analysis.

The electronic module 104 may be removably mounted to the band 102, e.g., as shown in FIGS. 1B and 1C. This feature allows the electronic module 104 to be easily removed from the band 102 and engaged with a computer to download data, e.g., as generally shown in FIG. 2. While any desired manner of removably mounting the electronic module 104 to the band 102 may be used without departing from this invention, in this illustrated example structure 100, the mounting is accomplished via a stem member 112 fitting into a pocket 114 provided in the band 102 and via a second stem member 116 having an enlarged head fitting into an opening 118 provided in the band 102.

The electronic module 104 also may include one or more output devices for transferring data from the module 104 to another device, such as a personal computer 200 (see FIG. 2). As some more specific examples, the extending stem member 112 of the electronic module 104 that fits into the pocket 114 formed in the band 102 may constitute a portion of a data transfer connector. This stem member 112 may constitute a USB type connector. If desired, the stem member 112 may be flexible (so that it can curve around the shape of the band 102 and fit comfortably around the wearer's wrist), and it may be constructed to mate in a conventional USB type port for connection to the computer 200. The module 104 may both transmit output and receive input through this stem member 112. More specific examples of watch structures having these types of input and/or output connections and features are described, for example, in the patent applications mentioned in the "Related Applications" Section above. As an alternative, if desired, the watch 100 may have a female type connection (e.g., a USB port) that engages with a male connector.

Figure 3:
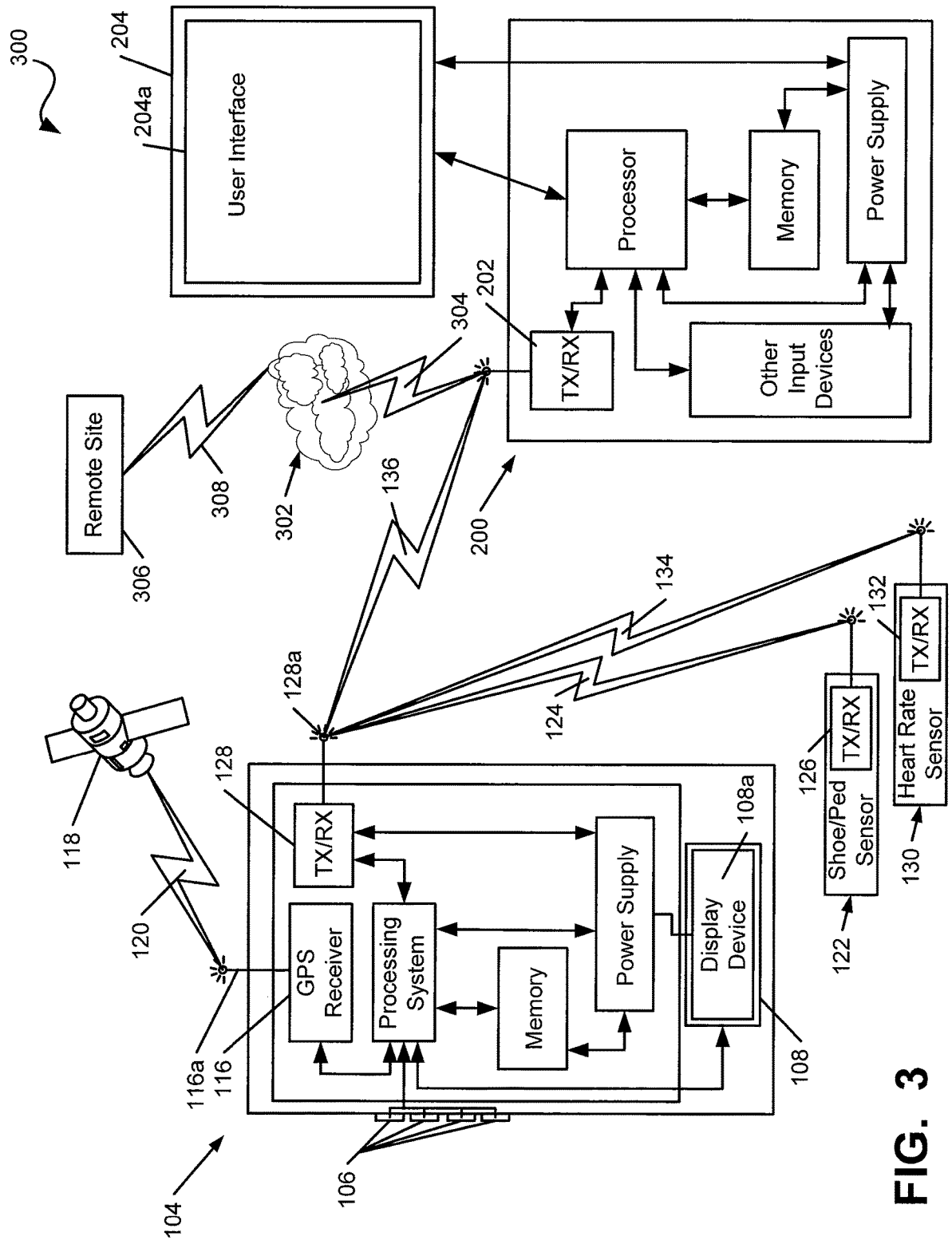
FIG. 3 illustrates an example overall system in which aspects of the invention may be utilized and/or practiced.

FIG. 3 provides a schematic block diagram of an overall system 300 in which aspects of the present invention may be used and/or practiced. The system 300 may include various sensors that monitor some physical or physiological aspect of a user's motion or an athletic performance. As shown in FIG. 3, this example system 300 includes the electronic module 104, which, as noted above, may include one or more input buttons 106 for receiving user input in the X, Y, and Z-axis directions and a display device 108 (e.g., for displaying information to the wearer, including a user interface 108a). The electronic module 104 (or some other device carried by the user during the athletic performance) also may include a GPS receiver 116 for interacting with a GPS satellite 118, e.g., in a conventional manner as is known in the GPS and navigation arts (shown by communications icon 120 in FIG. 3).

The electronic module 104 may receive input data from other sources as well. For example, as shown in FIG. 3, the electronic module 104 may receive input data from a shoe based sensor 122 (e.g., for receiving pedometer type speed and/or distance information, such as an accelerometer, including a one, two, or three axis accelerometer). This is illustrated in FIG. 3 by the data transmission icon 124 from a transmission device 126 associated with the shoe sensor 122 to a receiver device 128 operatively coupled with the electronic module 104. Data from a remote heart rate monitor 130 also may be sent from transmission device 132 to and received at an input receiver device 128 for the electronic module 104 (shown in FIG. 3 by transmission icon 134). Any desired types and/or numbers of sensors may be connected with the electronic module 104, in any desired manner (e.g., wired, wirelessly, etc.), using any desired type(s) of communications protocols, without departing from this invention. The data from the various sensors and other inputs may be received at one or more input devices on the electronic module 104 (such as transceiver 128) without departing from this invention. In some example systems, the GPS receiver 116 will be separate from the input device(s) for the other sensors, such as the input device 128 for the shoe sensor 122 and/or the input device 128 for the heart rate monitor 130. The various communications devices, e.g., devices 116, 126, 128, and 132, may be capable of both transmitting and receiving data from one or more sources (e.g., transceivers).

The electronic module 104 according to this illustrated example of this invention further includes a processing system, a memory, a power supply, and a display device 108 on which a user interface 108a is displayed and on which user interaction with the module 104 (or other components of the system 300) may be displayed and/or received. Other features and functionality may be provided in the electronic module 104 (or other portion of the overall system), such as time keeping and display capabilities, calendar display capabilities, chronographic capabilities (e.g., for measuring and displaying a stop watch, providing split times, etc.), alarm capabilities, etc.

The transceiver 128 (or other hardware) of the electronic module 104 is capable of exchanging data with another computer system (e.g., such as a personal computer, laptop, palmtop, cellular telephone, personal digital assistant, etc,), using, for example, a transceiver module 202 included with a personal computer 200, e.g., via a wired or wireless connection (shown in FIG. 3 by transmission icon 136). This connection also may be accomplished, if desired, by a hard connector, such as a USB type connection 112 shown in FIGS. 1B, 1C, and 2. As shown in FIG. 3, the computer 200 may be engaged with a network 302 (such as the Internet), shown by communications icon 304, to provide access to additional data, information, and functionality for the overall system. As a more specific example, the computer 200 may transfer the data to a remote networked site 306 (e.g., a web-based application, also called the "Remote Site" herein) via communications connections 304 and 308, optionally for use in a community setting (where data from several users is accepted, shared, stored, etc., and from which groups of users may be defined, information of common interest may be stored or shared, challenges may be issued, etc.). As an even more specific example, systems and methods in accordance with at least some examples of this invention may be used in conjunction with hardware and software like that used in the systems and methods commercially available from NIKE, Inc. of Beaverton, Oreg. under the trademark NIKE+™. At least some of the systems and methods according to this invention will include GPS features and functionality, e.g., as described in more detail below.

The computer 200 further may include a data processing system (e.g., one or more microprocessors), other input devices (e.g., a keyboard, a mouse, a track ball, a touch pad, a touch screen, a microphone, a joystick, etc.), a power supply, and a memory system. A display device 204 is provided on which a user interface 204a may be displayed and engaged by a user, e.g., in conventional manners as are known and used in the art. Examples of GPS based features of user interfaces 108a and 204a and examples of the user experience with GPS using systems and methods according to examples of this invention will be described in more detail below.

GPS System Functionality

As noted above, the watch 100 disclosed herein has global positioning satellite ("GPS") system features and functionality. To this end, the watch 100 may incorporate a GPS assembly as part of or in operable connection with the electronic module 104. The GPS assembly will be at least substantially contained within the housing of the watch 100 and may generally include a GPS receiver chip 116 and an associated GPS antenna 116*a*. The GPS receiver chip 116 is capable of a certain level of signal processing and is in operable communication with the main processing system of the watch 100. The GPS antenna 116*a* is connected to the GPS receiver 116 and may take the form of a sheet metal antenna in an exemplary embodiment. As shown in the illustrated example of FIG. 3, the watch 100 may incorporate separate antennas wherein the GPS antenna 116*a* communicates with the GPS receiver 116 and external GPS signals and the antenna 128*a* of the transceiver 128 communicates with the other external sensors, such as the shoe sensor 122 and the heart rate sensor 130.

As mentioned above, aspects of this invention may be practiced using data from global positioning satellite ("GPS") systems 116, 118 to assist in providing athletic performance data and enhancing the user experience. The hardware for collecting and using the GPS data and information may be incorporated into the watch structure 100, as described above and in the other Related Applications identified above (as used herein and unless otherwise specifically noted, the term "watch" is used generically to include any portable electronic device, including, for example, MP3 and/or other portable audio or video playback devices, cellular telephones, stand alone and portable athletic performance monitoring devices, etc., whether or not such devices include features for securing to a user's wrist). GPS data, information, control and functionality may be incorporated into a user interface 108*a* displayable on the watch 100. Additionally, GPS data, information, control and functionality may be incorporated into a user interface 204*a* available to the user on the computer, website, or other computing device for long term data storage and analysis. Moreover, many of the GPS related features described in more detail below relate to or expand on the GPS based systems and functionality described in: (a) U.S. Pat. No. 7,254,516 issued Aug. 7, 2007 in the name of Charles W. Case, Jr., et al., (b) U.S. Pat. No. 7,603,255 issued Oct. 13, 2009 in the name of Charles W. Case, Jr., et al., and (c) U.S. patent application Ser. No. 12/552,958 filed Sep. 2, 2009 in the name of Charles W. Case, Jr., et al. These prior U.S. patents and this pending U.S. patent application each is entirely incorporated herein by reference.

Figure 4A:
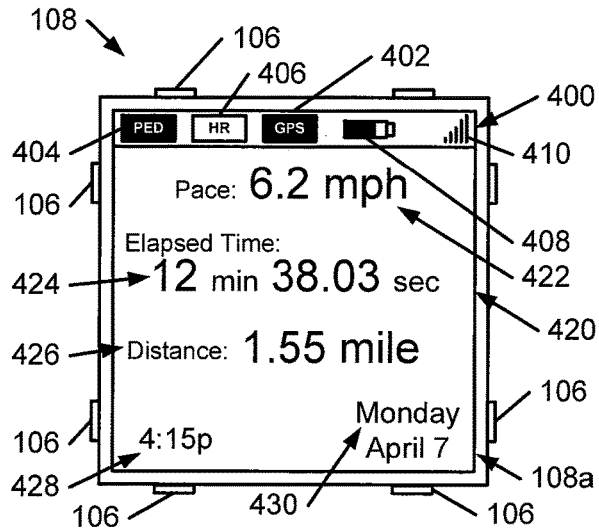
FIGS. 4A through 28 illustrate various example watch and/or computer interfaces, features, and functionality in accordance with aspects of this invention.
Figure 4B:
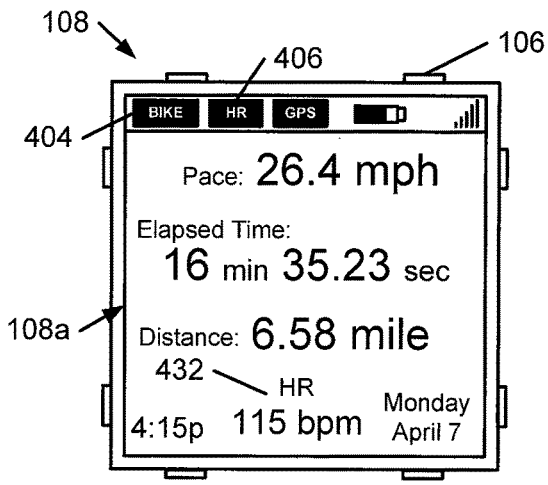

In addition to the various features of the hardware and/or firmware described above, additional features of the hardware and/or firmware will be described below as they relate to incorporation and use of GPS features in the system 300. Advantageously, in systems and methods in accordance with at least some examples of this invention, the watch 100 will be capable of receiving athletic performance data from multiple sources, and information regarding the incoming data and the performance results can be displayed on the watch display 108. FIGS. 4A through 4D illustrate various examples of watch displays 108 and information that may be included in the display 108. For example, as shown in FIG. 4A, the watch 100 may receive athletic performance data as monitored by a GPS based system 116, 118 and as monitored by a pedometer type speed and/or distance sensor (e.g., a shoe mounted pedometer based speed and distance monitor 122, such as those provided in systems commercially available from NIKE, Inc. of Beaverton, Oreg. under the trademark NIKE+™). Information regarding the available sensor systems may be displayed, for example, using icons 402 and 404, respectively, in a system bar 400 provided on the watch display 108. This system bar 400 may include additional information, such as information and status regarding other potentially available monitoring systems, such as the heart rate monitor status (via heart rate monitor "HR" icon 406), battery status (via battery status icon 408), and GPS (or other) signal strength (via signal strength icon 410). As shown in FIG. 4A, the icons for the active systems are shown highlighted (like icons 402 and 404) in FIG. 4A) and the icons of inactive or undetected systems are not highlighted (like icon 406). Alternatively, if desired, systems and methods according to examples of this invention may simply not display information in the system bar 400 regarding inactive or unused performance measuring systems (e.g., icon 406 could be omitted from system bar 400 if no heart rate monitor is detected). Any desired number, arrangement, and/or combination of different system status icons (including icons for systems other than those specifically described above) may be provided in the system bar 400 without departing from this invention.

The main display portion 420 of this interface 108*a* may include various performance metrics and other information. For example, as shown in FIG. 4A, this example interface 108*a* includes an instantaneous pace display area 422, an elapsed time display area 424, an overall distance display area 426, a current time display area 428, and a current day/date display area 430. Any desired number and types of display areas, in any desired arrangement, configuration, or orientation, may be provided on the display 108 without departing from this invention.

Figure 4C:
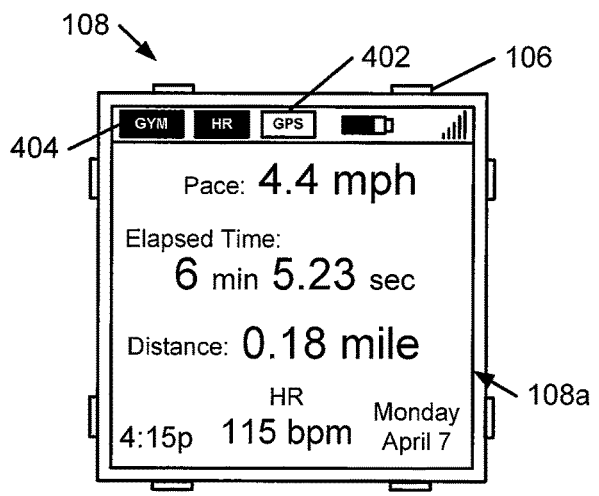

Systems and methods according to at least some examples of this invention also may be programmed and adapted to receive athletic performance data from other sources, such as gym equipment; bicycle speedometers; sensors built into skis, snowboards, mountain climbing equipment, or other athletic equipment; heart rate or pulse monitors 130 (or other physiological sensors); etc. As some more specific examples, the interface display 108*a* of FIG. 4B differs from that of FIG. 4A in that icon 404 corresponds to bicycle based speedometer data and the heart rate monitor is active (as shown by the activated icon 406). Activation of the heart rate monitor and detection of this data also induces display of instantaneous heart rate data in a heart rate display area 432 in this example. The interface display 108*a* of FIG. 4C differs from that of FIG. 4B in that icon 404 indicates that sensors relating to gym equipment (e.g., a treadmill, rowing machine, elliptical machine, ski simulator, stationary bicycle, etc.) are being detected at the watch 100 and data relating thereto is being displayed. FIG. 4C further illustrates that the GPS detection system is inactive (note the un-highlighted state of icon 402), which may be typical for an indoor gym setting.

Figure 4D:
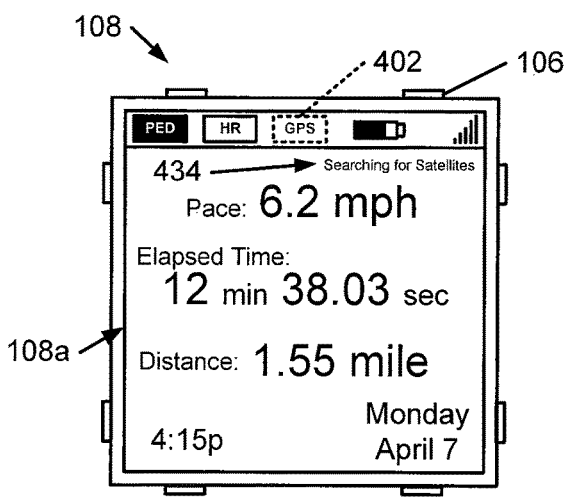

The ability to collect data from multiple athletic performance monitoring devices using a single user-carried athletic performance monitoring system can provide numerous advantages. For example, the pedometer type speed and distance sensor 122 (or other speed or distance sensor) can be relied upon at various times during a workout or other athletic performance when GPS data is not available for some reason. The pedometer based data alone can be relied upon when GPS data is compromised or unreliable, such as in heavily wooded areas, near large buildings, in extremely cloudy conditions, indoors, etc. Any time that the GPS satellite 118 data proves unreliable for any reason, systems and methods according to these examples of the invention can rely on the pedometer based data (and optionally other sensor data, such as compass data, altimeter data, speedometer data, etc.) to provide athletic performance monitoring data and to help fill in any holes or gaps in the GPS based data. When GPS data is unavailable or temporarily lost (or some other sensor signal has been lost), systems and methods according to at least some examples of this invention may provide indicators on the interface display 108a to advise the user of the lost sensor data. For example, as shown in FIG. 4D, the GPS icon 402 may start blinking (shown by dashed icon lines in FIG. 4D) when the connection to the GPS satellites 118 is lost and/or the main display portion 420 may provide an appropriate message, such as the "Searching for Satellites" message 434 shown in FIG. 4D. Systems and methods according to this invention may be able to determine which data is most accurate for a given performance (or even for portions or segments of a performance) and then piece together the most accurate data available (from any available sensor) to provide the most accurate overall speed and/or distance information for a given performance. Suspect data may be automatically eliminated, if the perceived inaccuracy or unreliability is too great.

As some more specific examples, systems and methods according to at least some examples of this invention may consider the reliability or accuracy of the data from the various sources (e.g., pedometer, GPS, etc.) repeatedly throughout a performance, and then choose the most likely reliable or accurate data over all portions or portions of the performance for making final data determinations, such as movement distance for a segment of a performance, overall movement distance for the performance, pace for a segment of the performance, overall pace for the performance, calories burned for a segment of the performance, overall calories burned for the performance, etc. Any desired algorithm and/or information may be considered in determining which data source (e.g., pedometer, GPS, etc.) is likely most reliable. For example, if desired, systems and methods according to the invention may evaluate the GPS reliability by considering the unit's exposure or connectivity to the various satellites (data that can be stored and geographically tagged throughout the performance). Then in making distance or pace determinations, systems and methods according to the invention may: (a) rely on GPS data (over pedometer or speedometer data) when the reliability is above a first threshold value, (b) rely on pedometer or speedometer data when the reliability is below a second threshold value, and (optionally) (c) consider other features of the data if the reliability is between these threshold values (if the first threshold value differs from the second threshold value). The other features of the data that might be considered may include, for example, the presence or absence of rapid changes in the GPS coordinates somewhat before or after the time of interest (which might indicate issues with the GPS data), battery power of the pedometer (which might indicate issues with the pedometer data), weather conditions (that might affect satellite exposure), route conditions, etc.

As another example, if desired, input from another sensor may be considered to evaluate which data source (e.g., pedometer, GPS, etc.) is likely most accurate. For example, if a user carries an accelerometer (e.g., body mounted, within the portable electronic device, etc.) along with the pedometer and GPS sensor systems, turns may be easily detected by the accelerometer while it may take the GPS system some time to relocate the user carried GPS antenna system and again track it after a turn is made. Thus, in situations where a turn has been made (as sensed by the accelerometer, which may be a one-axis, two-axis, or three-axis accelerometer), systems and methods according to this invention may determine that the pedometer data is more accurate for a time, especially if the GPS data indicates a continuing straight path and/or loss of connection at that same time period in the performance.

As another example, systems and methods according to this invention might compare the output of the two sensors (e.g., pedometer and GPS) and make some determination as to which is likely most accurate. As a more specific example, when working out on a treadmill, even indoors (such as in a gym), the user's GPS system may still have exposure to the GPS satellites. Thus, during this workout, the pedometer might register a great deal of activity while the GPS satellite indicates little or no movement. A similar situation may arise, for example, when a user runs in place (e.g., when stopped at a traffic light, while talking to someone, etc.). Systems and methods according to examples of this invention might compare the outputs to determine which sensor's output to use (at least for a portion of the performance). For example, if the workout is on a treadmill, the GPS sensor will not register significant latitudinal and/or longitudinal movement over long periods of time, whereas when stopped at a corner and running in place, GPS movement will be evident both before and after the temporary (and relatively short) stop in latitudinal and longitudinal movement. Additionally, running in place will have a different ground contact force profile over the surface area of the foot and/or contact angle as compared to actual running on a road or on a treadmill, and foot contact pressure changes over the area of the foot or other foot contact data may be looked at to determine if the user is actually running (even on a treadmill) as compared to running in place. As another example, if desired, map data may be consulted, e.g., to help determine if the user is inside or outside. In such situations, the appropriate data source can be selected for various portions or segments of the run, and the calculations can be made (e.g., distance, pace, calorie burn, etc.) using the most accurate data available for each segment of the run.

Calculations of the types described above (e.g., to determine the most accurate data available for various segments of the run) may be conducted on the watch 100, on the personal computer 200 to which the performance data is downloaded, and/or on a remote computer site 306 to which the performance data is transmitted for storage and/or analysis. In some example systems and methods according to the invention, the performance data provided on the watch display 108 during the performance may be from one (or more sources), and data correction may take place later, after the performance data is downloaded to the personal computer 200 and/or remote computer site 306.

Figure 5A:
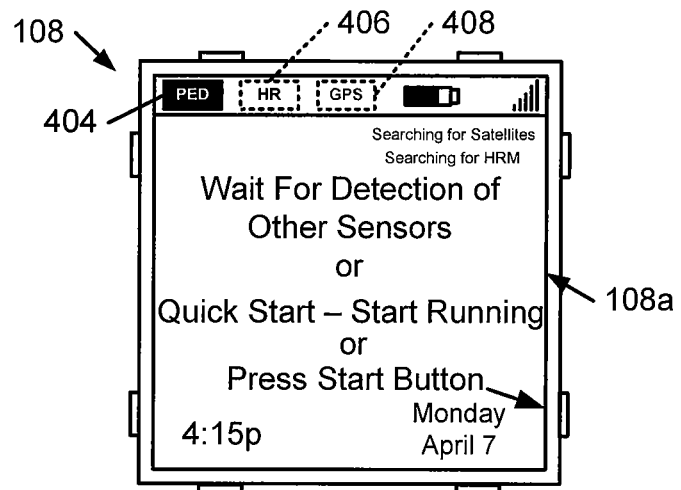
Figure 5B:
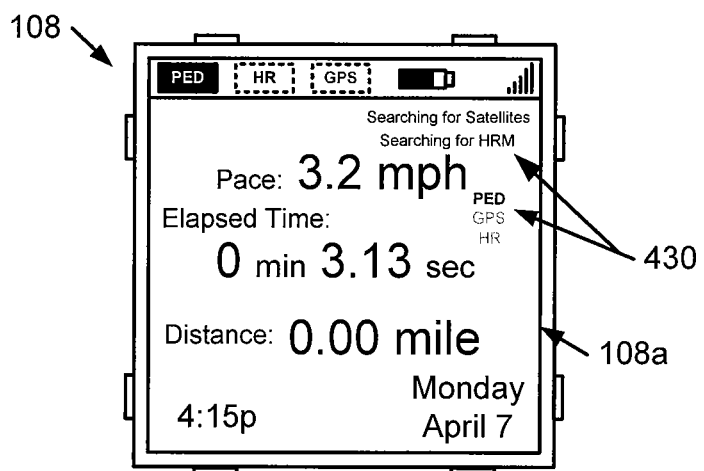

The use of multiple speed and/or distance sensors in a single athletic performance monitoring system 300 may have other useful benefits as well. For example, during an initial phase of a workout, GPS data may not be available because the GPS system 116, 118 has not yet fixed the location of the athlete with respect to the satellites 118. Locking on the satellites 118 can take several minutes, in some instances. Some users may not wish to spend a great amount of "down time" before their workout (e.g., after getting ready, stretching, etc.) waiting for the performance monitoring system to fully boot up (specifically, waiting for GPS signals to be available). Typically, however, the pedometer based sensors 122 are readily detected and immediately available for use. Therefore, the inclusion of the pedometer based speed and distance sensor 122 in the overall system allows for a "quick start" feature, using the pedometer based data while the GPS system initializes and becomes active. FIGS. 5A and 5B illustrate one example of information conveyed to the user via the watch display 108 in systems and methods according to this aspect of the invention. As shown in FIG. 5A, as soon as the pedometer based sensor is detected (shown by the highlighted icon 404 in FIG. 5A), the system displays a message to the user asking if they prefer to wait for detection of the other sensors (heart rate monitor and GPS, in this illustrated example) or whether they want to utilize the "quick start" feature. If the user prefers to wait, they can wait until the desired sensor(s) are detected, which, in this illustrated system, could be indicated by a change in icons 402 and 406 and/or a change in the "searching" or other messages. Alternatively, if the user prefers to start the workout, they can either interact with a "start" button (as shown, the interface display 108*a* may "remind" the user of which button is the "start" button) or simply begin running (or other workout activity), which would be detected by a change in the pedometer sensor output (or other sensor output). FIG. 5B shows an example of the manner in which the display screen 108 may change if the quick start option is selected (e.g., the display of the pace, time, distance, and/or other information may begin while indicators 430 show the sensor data being received and the sensors for which detection is still being sought).

GPS data also can be used extensively in correcting the data collected by and calibrating the watch 100 described above, including calibration of pedometer based speed and/or distance monitors 122 (and/or other speed or distance monitors) used in a common system with the GPS based athletic performance monitoring system. For example, the actual athlete movement distance as determined using the GPS system 116/118 can be used to provide calibration data for the pedometer based speed and/or distance monitor 122 and/or to correct the data collected by such sensors under a plurality of different conditions of use. As some more specific examples, different calibration conditions and/or calibration or correction data may be used under different pace conditions (running paces v. jogging paces v. walking paces), different temperature conditions, different wind conditions, different elevation change conditions (uphill v. downhill v. flat, steep slope v. moderate slope, etc.) and/or under any differing conditions where a user's step size might be expected to change. Using the GPS generated data along with map or other topographical data, speed and distance calibration or correction data for use under a wide variety of different performance conditions can be developed automatically, in the background, with little or no user input and/or awareness of the feature. As a more specific example, systems and methods according to this invention may keep a log of recorded distances from the pedometer v. actual distances as measured by the GPS system over a wide range of paces, elevational changes, or other conditions. Then, for future performances, the noted pace (and optionally other conditions, such as elevation change, specific location along a route, location within the workout, time into the workout, etc.) can be compared against the conditions cataloged for the various calibration data sets, and a best fit for the calibration or correction data can be selected and used to adjust the recorded pedometer distance, even if the actual GPS measured distance data is not available for that performance. GPS information can be used in calibrating any desired type of sensor (e.g., bike speedometer, rowing speed/distance monitor, etc.), including multiple types of sensors capable of communicating with a single watch device 100.

In some example systems and methods in accordance with this invention, pedometer based data and GPS based data may be used together to estimate elevational changes, which may be used to provide more accurate distance measurements and/or calorie burn measurements when a user is moving on a hill. GPS systems 116, 118 essentially detect and measure overhead changes in position (e.g., changes in latitudinal and longitudinal positions of the GPS receiver/transmitter 116), while pedometer based speed and distance sensors 122 typically detect and measure features of foot contact with the ground (e.g., step count, foot loft time, foot impact force, etc.). Relying on GPS data alone may provide inaccurate distance information on a hill (e.g., due to a relatively small overhead latitudinal and longitudinal position change as compared to actual ground distance traveled along the slope), and relying on pedometer data alone may provide inaccurate low or high distance information on a hill (e.g., due to the changing step count and step size when moving up or down a slope). Using both pedometer step data and GPS data (and optionally topographical map data), however, elevation changes and slopes for hilly areas may be better determined or estimated, which may provide better actual distance data (i.e., along the slope direction) for use on hills. For example, relatively small GPS latitude or longitude data changes coupled with several steps (and optionally other characteristics of the step, such as step contact force, step force application profile over the foot surface area, step angle, etc.) may be determined by systems and methods according to at least some examples of this invention as constituting an uphill climb area. As another example, relatively small GPS latitude or longitude data changes coupled with few but relatively high force or long foot loft time steps (and optionally other characteristics of the step, such as step force application profile over the foot surface area, step contact angle, etc.) may be determined by systems and methods according to at least some examples of this invention as constituting a downhill area. This type of information can be used to estimate the steepness of the hill and provide correction factors for various finally determined metrics, such as actual distance traveled, calories burned, pace, etc. Moreover, this data can be used to develop calibration data for use in future situations (e.g., when similar combinations of GPS positional change and step characteristic features are encountered). As another potential option, this type of data may be used to trigger systems and methods according to examples of this invention to consult topographical map data for the location (as noted by the GPS coordinates) and to obtain elevation change information for the noted location from that source.

As another potential feature in at least some systems and methods in accordance with this invention, data may be input to the watch 100 from additional sources, such as a compass or an altimeter. Such additional data can be used in various manners without departing from this invention. For example, if compass functionality is provided (e.g., incorporated into the watch structure 100), the compass data along with the pedometer based speed and distance data may be used to help continually determine the athlete's position (latitudinal and longitudinal coordinates) even if GPS data is unavailable for some time during the athletic performance. Altimeter data also can be used in various ways, e.g., to help develop calibration data for the pedometer based speed and distance data, optionally at various different paces, for use in uphill and/or downhill conditions as described above. Altimeter data also may be used to provide more accurate calorie burn counting algorithms.

User Experience on a Portable Device (Such as Watch 100)

The inclusion of GPS based features in systems and methods in accordance with at least some examples of this invention will result in the inclusion of various features in the various user interfaces 108*a*, 204*a* associated with the systems and methods, e.g., both on the portable watch device itself 100 and/or on a computing device 200 with which the portable device 100 may be eventually connected, if necessary (e.g., to exchange data, receive firmware updates, etc.). While the description below may relate to example features of the user experience as it relates to the display and function of the watch device 100 (or other portable electronic device carried by the user during the workout), those skilled in the art will recognize that these various features (or similar features) also may be provided, used, and/or controlled through a user interface 204a provided for use with the computing device 200 with which the watch 100 may be eventually connected to upload the workout data.

Figure 6:
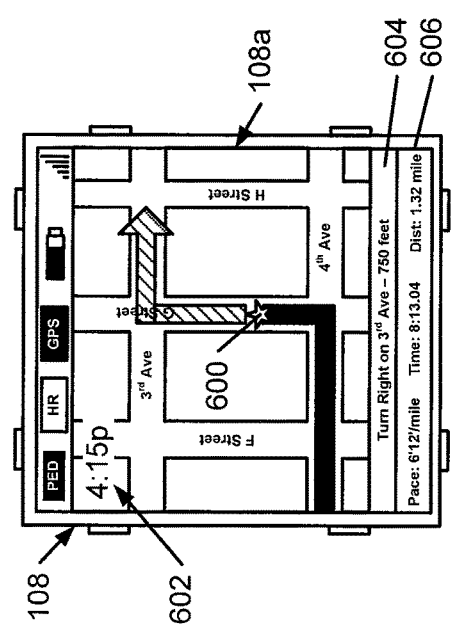

In some example systems and methods in accordance with this invention, the watch display 108 may include, at least some of the time, a video, pictorial, topographical, or other graphical representation of the route to be covered (or being covered) during the athletic performance (e.g., a circuit or other representation of the athlete's path on a map or satellite image of the route). One example of such a display 108 is shown in FIG. 6. Utilizing the GPS features, the athlete's location along the route (shown as a star icon 600 in FIG. 6) may be displayed on the display screen 108 of the watch 100, in real time, as the performance is taking place. Notably, in this illustrated example display screen 108, the portion of the route that has been covered is shown in a different manner (e.g., a different color) from the portion of the route being approached (although this is not a requirement). FIG. 6 further shows that the display screen 108 includes additional information, such as the current time in time display area 602, approaching route information in route bar 604 (such as a "next turn identifier"), and various performance metrics in performance bar 606 (such as pace, elapsed time, distance, heart rate, and/or other physical and/or physiological data). Any desired type of information and orientation or arrangement of information may be displayed in the interface display 108a without departing from this invention.

Additionally or alternatively, if desired, information from the interface display 108a (or other desired information) also may be presented to the user in another manner during the athletic performance, such as via an audio output (e.g., through headphones or a speaker).

Figure 7:
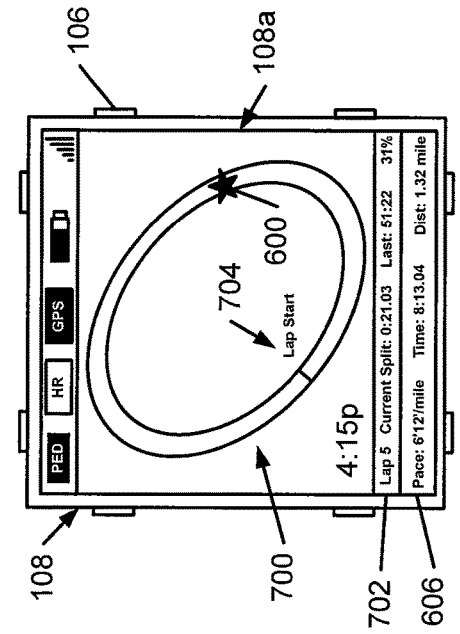

For routes that include multiple trips around the same circuit or path (e.g., laps), the athlete's position within the lap may be displayed on the screen 108 of the watch 100 (optionally along with an audio, visual, or tactile based lap counter), in real time, as the performance is taking place. One example of such an interface display 108a is shown in FIG. 7. As shown in this figure, such an interface display 108a may include a representation of the route 700 (an oval track, in this example), a performance bar 606, and a current lap bar 702 for providing various metrics relating to the current lap (or other information), such as current lap number, current time within lap, last lap time, percentage of lap completed, etc. The interface 108a further may include an indicator 600 showing the user's present location within the lap. More, less, or different information may be provided on the display 108, also in different orientations and relative positionings, without departing from the invention.

As additional potential options, if desired, using the GPS features, systems and methods according to examples of this invention may automatically record lap times and/or split times (or other time subset features) based on the athlete passing a specific geographic location. For example, as shown in FIG. 7, the representation of the route 700 may include an indicator 704 of a lap start/stop location, which may be determined automatically by the system (e.g., using GPS and by detecting a location where running began) or by user input (such as by the user manually interacting with a watch button 106 to mark the start/end line). This automatic lap or split timing feature (which can be preset by the user prior to the workout, if desired, e.g., using the computing device interface 204a) can help the athlete avoid numerous interactions with the watch during the event to manually mark laps (which can slow the user down) and/or avoid inaccuracies (by failing to manually mark one or more split times).

Figure 8B:
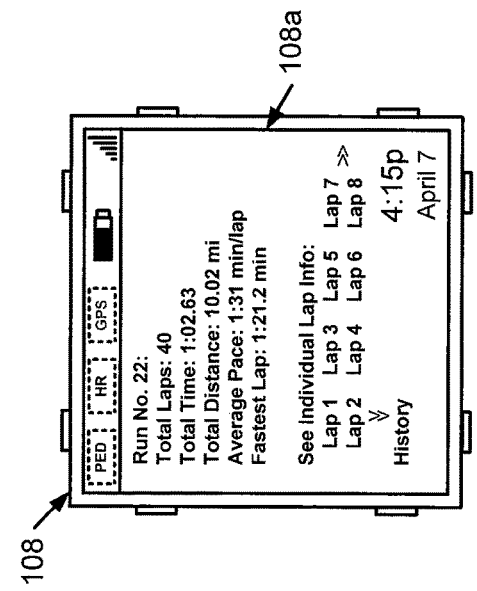
Figure 8A:
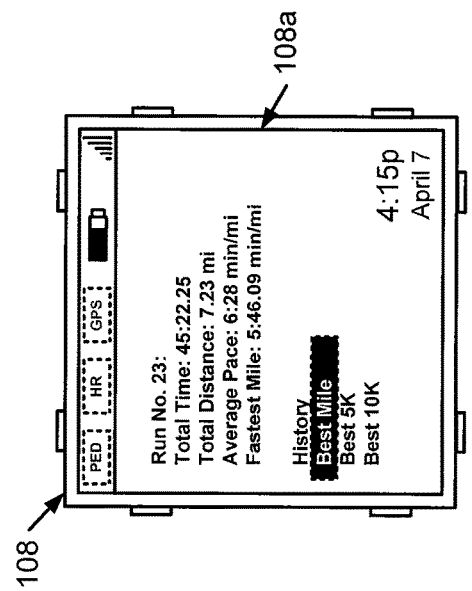

The watch interface 108a in at least some example systems and methods according to this invention also can be used to review various workout metrics, e.g., during a workout or after a workout is completed. See, for example, FIGS. 8A and 8B. In the example of FIG. 8A, a watch display screen 108 shows data for various metrics and/or other features of that run, as well as an interface 108a that allows the user to select historical information relating to other runs (e.g., by interacting with buttons 106, by a touch screen system, etc.). The example information in the interface display 108a of FIG. 8A relates to data for a "free form" run. FIG. 8B, on the other hand, provides an example interface display 108a relating to a run of multiple laps around a circuitous pattern. Notably, the example interface 108a of FIG. 8B allows the user to see information about specific laps within a given run, as well as historical information relating to other runs (whether free form or circuitous lap type runs).

Using the GPS data, the metrics for a given workout, such as pace, heart rate, distance, etc., can be associated with a specific location along a lap, route, or portion of a route at which that metric was measured or determined. GPS tagging the data may be accomplished automatically by systems and methods in accordance with this invention and/or may be selectively activated by the user at specific locations along the route. These features can also be used (and possibly expanded upon) when reviewing workout metrics on the watch 100 and/or on a separate computer device 200 (e.g., to which the watch 100 may be connected for data uploads) after the workout is completed (e.g., on a website akin to the present NIKE+ website and computer interface), e.g., by providing a way for a user to input a request for more information for a given location. This feature will be described in more detail below in conjunction with the descriptions of FIGS. 23A and 25A.

As additional potential features, systems and methods in accordance with at least some examples of this invention may be programmed and adapted to provide specific, geographically tied messages to the athlete as he or she moves along a route and/or participates in an athletic performance. While any desired type of information may be provided in any desired form or format (e.g., audio, video, textual, tactile, etc.), in systems and methods in accordance with at least some examples of this invention, the messages may include messages predefined by the user; messages provided to the system by a third party, such as friends or colleagues of the athlete, coaches or trainers, and the like; and/or system generated automatic messages. Optionally, if desired, the user can "opt out" of received such messages from any of the noted sources, e.g., using the "settings" or "configuration" capabilities of the system.

Figure 9:
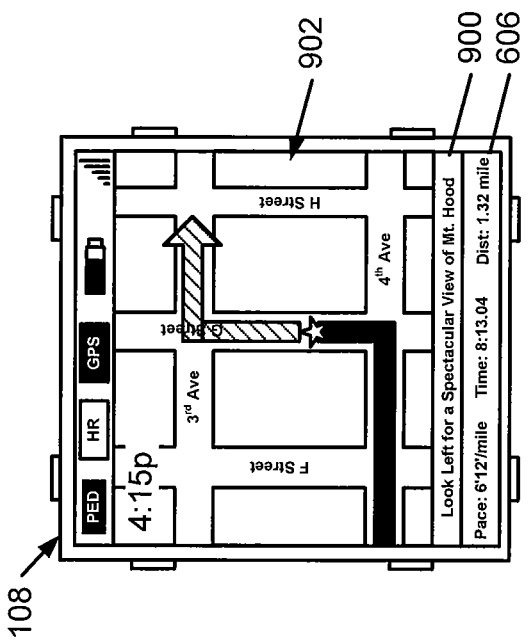

FIG. 9 illustrates one more specific example of this type of geographically tied messaging. In this example, a geographical information bar 900 is provided (e.g., either full time or in a temporary manner, such as a temporary replacement of the route bar of 604 of FIG. 6 and/or the performance bar 606). In this example, the geographical information bar 900 advises the user to "look left for a spectacular view of Mt. Hood," although any desired message content can be provided. As another alternative, if desired, the geographically tied message may be overlaid on some or all of the map portion 902 of the main display (optionally in a partially transparent manner) or it may replace all or some of the map portion 902. Any desired way of displaying or otherwise providing the geographically tied message may be used without departing from this invention. Additionally, if desired, an "alert" could be provided (e.g., a beep, other audio output (from a watch speaker, through headphones, etc.), or tactile output) to advise the user that a new message is being displayed on the watch display 108.

Figure 10:
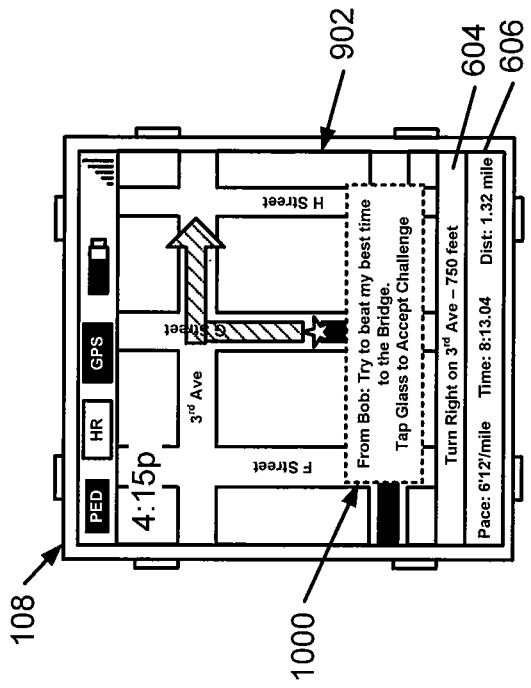

These geographically tied message features of systems and methods in accordance with at least some examples of this invention also may relate to the "community" aspects of the invention, such as the ability to share workout data, routes, and other information relating to one's workout program with friends, colleagues, coaches, trainers, etc., e.g., using an on-line or networked environment. In such a community arrangement, a third party (such as a friend, coach, trainer, celebrity, etc.), using his or her computing device connection, may insert a locational "cookie" along another athlete's typical workout route (or at any desired geographical location). For example, Friend A may leave a "verbal" or "textual reward" or other reward information for Athlete A at a certain geographical location, such as the top of a big local hill. FIG. 10 illustrates a display screen 108 including display of such information in a partially transparent overlaid message display box 1000. Notably, this message 1000 indicates the user from which the cookie was received (although anonymous cookies also could be sent, if desired). This partially transparent type of overlay message box 1000 is advantageous because the user does not even temporarily lose sight of the other information provided by the watch 100, such as the information in the route bar of 604 or the performance bar 606. If desired, the overlay message box 1000 could be initially displayed at one transparency level (e.g., up to and including 0% transparent) and gradually fade to lower levels until it finally disappears. Additionally or alternatively, if desired, the watch 100 may allow the user to provide input (e.g., via buttons 106, via a touch screen, etc.) to allow redisplay of and/or scrolling through the various cookie messages received during an athletic performance.

FIG. 10 illustrates another feature that may be provided using the GPS features of systems and methods according to at least some examples of this invention. As shown, the message 1000 from "Bob" in this example includes an "on-the-fly" performance "challenge" to the user and prompts the user to "accept" the challenge by providing input to the system (e.g., by tapping the glass of the watch display 108 in this example). Triggering of this message may be initiated by a geographic location tag as described above (and in more detail below) Once the user accepts the challenge (or optionally automatically), using the GPS features, the system may record the user's time over the challenge area ("to the bridge" in this illustrated example), and compare the user's time with Bob's challenge time. Feedback information may be given, to both the user and the challenger, over the course of the challenge (e.g., on the watch display 108) and/or after the challenge is completed (on the watch display 108 and/or on one or both user's computer interface 204a). If necessary, the GPS functionality of the watch 100 may re-program the user's route to cover the same route as that used in presenting the challenge (e.g., if the user's initial route differs from the challenger's route) and/or to assure that the same route is covered by each user. In this way, the challenger need not know in advance the route(s) that the user selected for his or her workout.

Figures 11A, 11B, 11C:
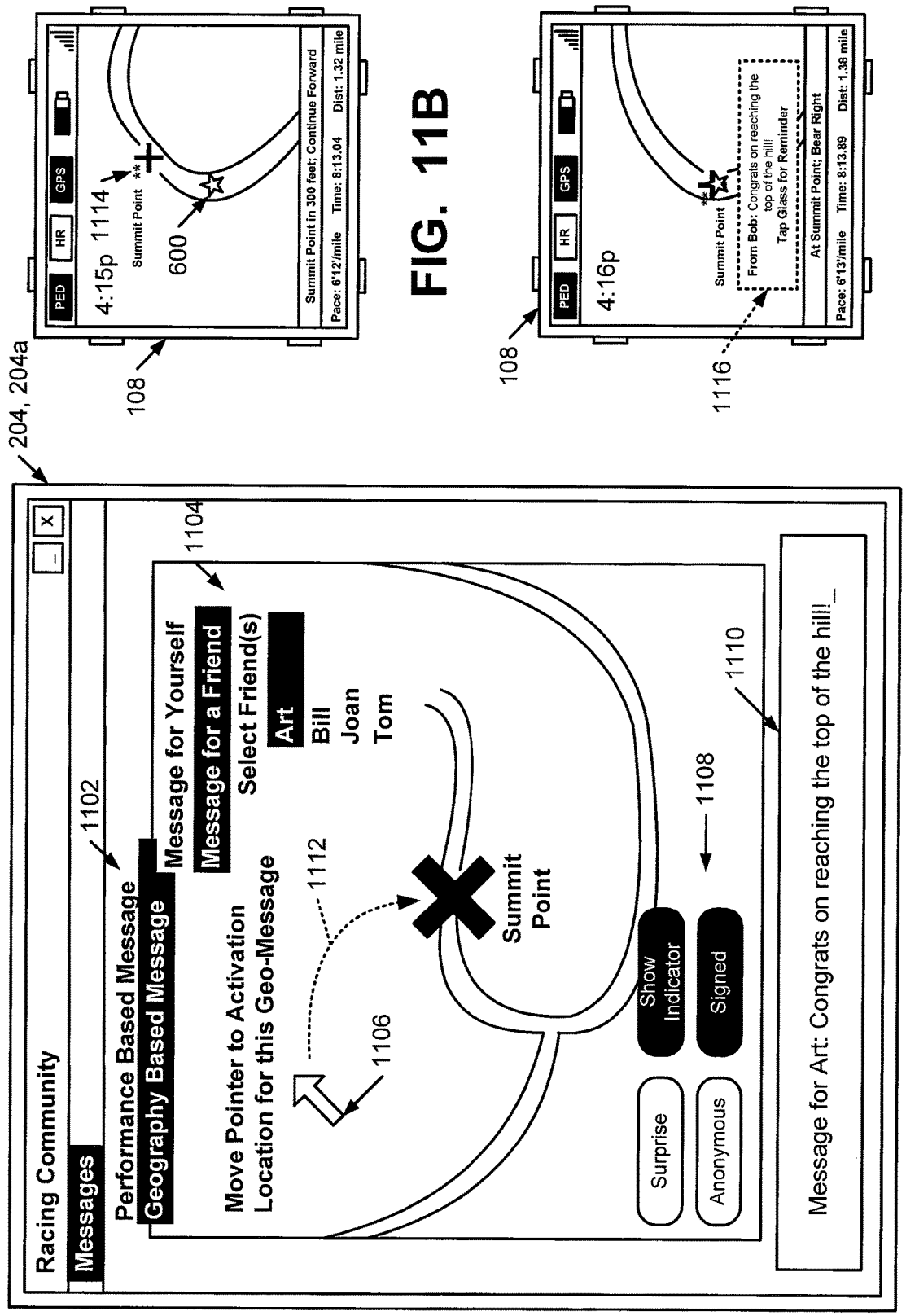

FIGS. 11A through 11C illustrate examples of user interfaces, both on the computer display 204 (FIG. 11A) through which the location cookie may be initially entered and on the watch display 108. As shown in FIG. 11A, any member of a "community" may leave geographic and/or performance based messages for other members (including themselves), and the interface 204a will provide interface elements for doing so. As shown in FIG. 11A, this example interface 204a provides interface elements and icons that allow the user to select: (a) the type of message (e.g., performance or geography based, see interface elements 1102), (b) the recipient of the message (see interface elements 1104, (c) the location at which the message will be triggered (see interface pointer element 1106), and (d) various features of the message (see interface elements 1108). The user may interact with the various interface elements in any desired manner without departing from this invention, including through the use of a mouse, keyboard, touch screen, touch pad, roller ball, stylus, joystick, etc. Additionally, the various interface elements may be activated and interacted with via the input device in manners that are conventionally known and used in the computer arts. The interface 204a further includes an input panel 1110 through which the message may be entered (e.g., via a keyboard (hard or soft) or other input device). This message (or other data delivered to the athlete's watch) also is called a "message payload" herein. If desired, the interface 204a may allow selection of other features of the message payload, such as type (e.g., audio or tactile features to signal that a message has arrived), duration, graphics, etc.

While FIG. 11A shows an example interface display 204a for creating and leaving a message or "cookie," FIGS. 11B and 11C show example interface displays 108a on the watch 100 received by the recipient user as the location of the cookie is approached. FIG. 11B shows the interface display 108a shortly before the user arrives at the location of the cookie. This is shown in FIG. 11B by the user location icon 600 approaching "Summit Point," the place where the geographically tagged message was left (notably, FIG. 11A shows that the pointer element 1106 was moved to the Summit Point location by pointer track arrow 1112). Because the geographical cookie was created in a manner so as to be displayed to the recipient (as shown in FIG. 11A by the highlighting of the "Show Indicator" icon as opposed to the "Surprise" icon), the user's interface display 108a includes a geo-tag icon 1114 at the cookie's location. Any desired way of displaying the existence and location of a geo-tag may be used without departing from this invention, including color changes, other icons, etc. The inclusion of a geo-tag icon on the athlete's interface display 108a can provide motivation for the athlete to get to the noted location to collect the "cookie." Alternatively, if the "Surprise" icon is selected in input area 1108, the geo-tag icon 1114 can be omitted from the displayed information.

FIG. 11C shows the athlete's interface display 108a at a time when the geo-tag location is reached. As shown by this example, the geo-tag activated a textual display 1116 on the user's display 108 to display the message input at location 1110 of interface 204a (i.e., delivering the message payload). Any desired manner of displaying the message may be used without departing from this invention, including the various manners described above, e.g., audio, textual, as an overlay (fading), in one of the other "bars," etc. In this example, the message display 1116 indicates that the message is from a specific user ("Bob" in this example). Notably, as shown in FIG. 11A, the input used in creating the message indicated that the message should be "signed" as opposed to "anonymous." Optionally, if desired, the interface 204a could include the ability for the message generator to sign the message in any desired manner (e.g., "Your Secret Admirer," etc.) or to include no identifying "signature."

Notably, using this downloaded message configuration, the watch 100 appears to the user to be network (e.g., WiFi, WAN, cellular, etc.) connected during the performance (e.g., by getting messages from third parties based on current location), but there is no need for a networked connection during the athletic performance to provide these geographically tagged messages.

As noted above, systems and methods according to the invention may or may not advise Athlete A of the existence of at least some of these types of locational cookies (e.g., to either provide an incentive to reach the geographic location or to provide a "surprise" reward when the location is reached), but the necessary information (e.g., the geographical location and the desired reward data) may be downloaded to the athlete's watch 100 when he/she connects to the community system (e.g., through the computing device). Then, when the athlete is working out, whenever he/she reaches the predetermined geographical location (as determined by GPS), the pre-established message will be presented (e.g., an encouraging message; a congratulatory message; a further challenge message; an audio, video, or textual message; etc.). If desired, presentation of the message will be triggered only if other monitoring systems associated with the athlete (such as a pedometer based speed and distance monitoring system 122, a bicycle speedometer, a force sensor in a shoe, pedal, or oar lock, etc.) indicate that the athlete reached the geographic location as a result of a workout (to prevent "cheating" or inadvertent triggering of the message), and not as a result of driving a car or otherwise reaching the location. The "cookie" also could be structured so that the message is triggered only as a result of a specific type or types of workout (e.g., by a run workout, by a biking workout, etc.).

FIG. 11C illustrates another feature that may be included in systems and methods according to examples of this invention that include this type of geo-tag (or performance tag or other) messaging capability. Display of message 1116 activates a feature that allows the message recipient to enter input "reminding" him/her that they received this message (e.g., by tapping the watch face glass, by making a gesture, by pressing a hard button, etc.). Over the course of a workout, a user may forget that they received such a message, and they may desire this type of reminder (e.g., on the watch display 108, on their computer display 204, etc.) so that they can take appropriate action (e.g., send a "thank you," issue a challenge to others, talk "trash," etc.). This interface 108a further provides the user with an easy opportunity to generate and receive such a "reminder" without significantly interrupting his/her workout to input data for the reminder.

Systems and methods in accordance with this invention also may provide GPS information, e.g., within the "settings" feature of the watch device 100. For example, at a specific location, information regarding satellite exposure (e.g., number of satellites viewing the device, strength of signal, reliability of signal, etc.) may be provided by the watch device and optionally stored as a workout is conducted. This information may be collected periodically over the course of an athletic performance. Such information may be useful, before, during, or after a workout, to determine which data set may be more reliable on a given date and/or at a given location (e.g., GPS data, pedometer data, pedometer data optionally coupled with other data, such as compass or altimeter data, etc.). In this manner, systems and methods in accordance with this invention can determine (automatically and/or through user input) the most accurate speed and distance information available during any given athletic performance (or portion thereof).

Figure 12:
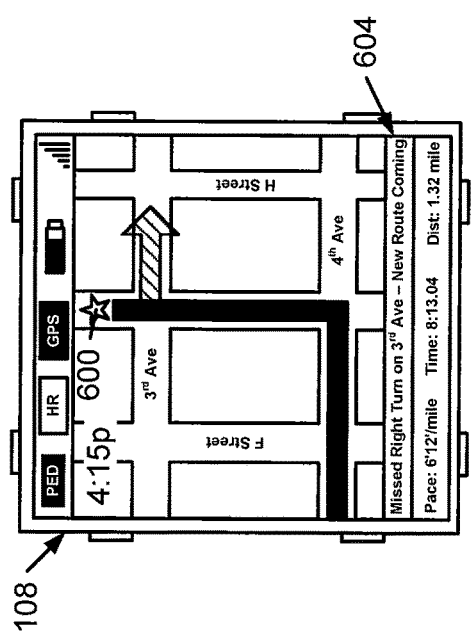

As noted above, in some modes of operation, systems and methods in accordance with at least some examples of this invention may provide live, real-time, "turn-by-turn" directions or instructions on the watch display 108 to help keep the athlete on a desired route during the performance. One example of such an interface display 108a is shown in FIG. 12. These directions and instructions may be based, at least in part, on GPS data available during the athletic performance. The directions or instructions may be provided to the user in any desired manner or combination of manners without departing from this invention, such as via graphical or textual information provided on the watch display 108, via audio or video information (e.g., played on headphones, from a speaker on the watch, on the watch display, etc.), via tactile information (e.g., vibrational indicators, etc.), and the like. Various additional features also may be provided, such as a countdown to the turn, different audio sounds for approaching left turns v. right turns, different vibrational responses for approaching right turns v. left turns, etc.

Also, if desired, as shown in FIG. 12, systems and methods according to the invention may provide updated directions on the fly during the athletic performance (e.g., through the watch display 108) to get a runner back on the desired route (should they stray from the pre-planned route), or to provide "detour route" determination capabilities, should the suggested route be unavailable or unused for some reason (e.g., road construction, flooding, etc.). As shown in FIG. 12, when the user missed the turn on the initial route (as shown by icon 600 passing the desired $3^{rd}$ Avenue turn), the system provided an indicator to the user that a "new route" is being determined (see the information in route bar 604). An audio indicator also may be provided. Systems and methods according to the invention can determine a new "route" in any desired manner, e.g., the shortest route to get the user back to this originally planned route, a route to get the user to the same ultimate destination in the same (or a similar) overall distance, or a new route that will travel the same (or similar) overall distance as the initially planned route.

Figure 13A:
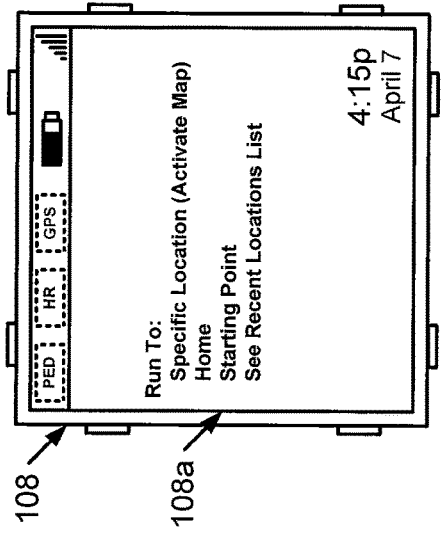
Figure 13B:
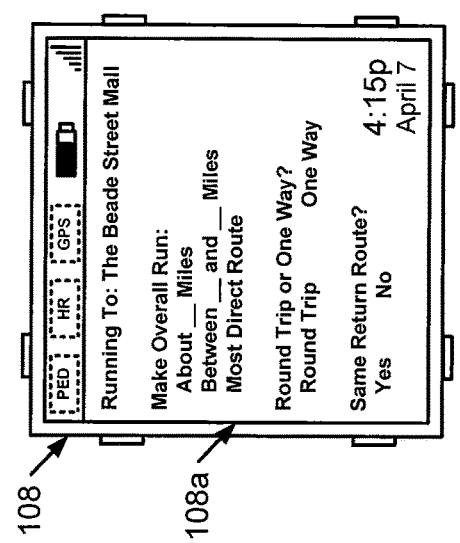

Another useful feature that may be included in systems and methods in accordance with at least some examples of this invention relates to the use of GPS for "to location" type navigation. FIGS. 13A and 13B illustrate example interfaces 108a on watch displays 108 that may be useful with this feature. In one example, as shown in FIG. 13A, a person may decide that they wish to run to a specific landmark (e.g., to the top of the hill on $4^{th}$ Street, to a specific intersection, to home, to their initial starting point, to a recently used location, to a specific business locale, etc.). By setting up their system to allow input of this locational target (e.g., using the website features through computer 200 and/or features available on the watch 100), systems and methods in accordance with this invention may use GPS and mapping capabilities to develop a route for the user that will get them to the desired location. This route determination feature may be further enhanced with various features, such as by having systems and methods according to the invention determine a route to the desired location that may include various features, such as a route to cover an overall targeted distance, a route to provide the most direct route, a one way or two way route, a route having the same or a different return trip route, etc. Note, for example, the various options provided in the interface display 108a of FIG. 13B. As another example, systems and methods according to the invention may develop a route to reach the desired location at a particular time within the overall run route (e.g., about ½ hour into the run that may last for 2 hours, or at about the halfway point) or at a particular distance within an overall run route. The route(s) also could be developed so as to minimize or maximize various features of the run, such as: minimize intersection crossings, maximize (or minimize) time on trails, maximize areas with scenic "views," minimize (or maximize) elevational changes, minimize urban areas, etc. These systems and methods in accordance with the invention may utilize input from a more global community regarding the routes, so as to better identify routes with certain characteristics, such as scenic views, water or rest room facilities, etc., as will be described in more detail below. Again, the watch 100 may be programmed and adapted to be capable of giving the user directions back to the desired route, should they stray, or detour directions, as described above in conjunction with FIG. 12.

"To location" navigation can work in other ways as well. For example, a user in an unfamiliar city (e.g., on vacation or a business trip) could begin a run (e.g., at the hotel front door) by tapping his or her watch (or otherwise entering input) to store a "marker" or "way point" (e.g., to store the GPS coordinates associated with this location or marker point) in a memory contained in the watch 100. Alternatively (or in the absence of other input), the starting point of a workout may be automatically identified by systems and methods according to this invention as being a "home" or "starting" point. Then, at some time during the run, the user could enter a command into the watch (e.g., by pressing a button, by a predetermined gesture, by touch screen input, etc.) to "take me home," and the GPS system, through the watch, could give the user directions taking him or her back to the initially noted (or automatically detected) home marker or way point location. If desired, systems and methods according to examples of this invention may allow any location to be marked (not just a home base) for a potential return during the workout. The system could default to provide the shortest route to return home, although other options may be made available if desired (e.g., reversing the outgoing route, minimal road crossings, etc.).

The type of "to location" navigation also could be used to help users locate, on-the-fly, various facilities, such as the closest public restrooms, drinking fountains, etc., using the GPS capabilities. Any desired information of this type could be conveyed in this manner, in real time, as the performance is taking place.

Figure 14:
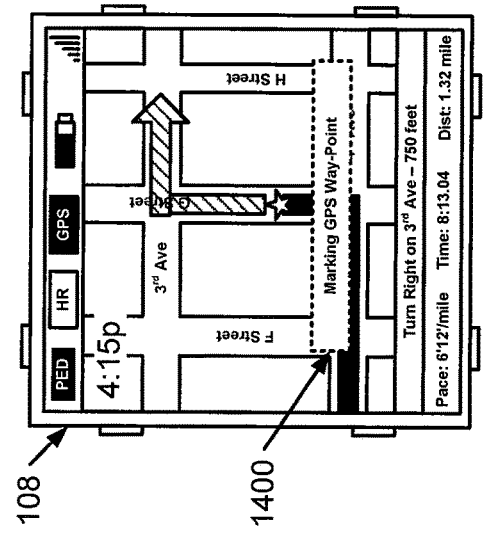

In some example systems and methods in accordance with aspects of this invention, users may mark the GPS coordinates of any locations passed during the course of the athletic performance using the watch device 100. For example, as shown in FIG. 14, during a run, a user may pass an interesting shop or other landmark to which they may wish to return (either later, during the course of the run, as a finish line for the run, or just at some later time (e.g., even when not running)). The user may interact with the watch 100 in some manner (e.g., tapping the screen or crystal, pressing a hard button, making a predefined gesture, etc.) to record the GPS coordinates for that location (also called a "way point" herein). This is shown in FIG. 14, for example, by display of a dialog box 1400 indicating that the GPS way-point coordinates are being stored. Then systems and methods in accordance with examples of the invention may provide information to assist the user in returning to that location. For example, on the watch device itself, GPS could be used at any desired time to provide turn-by-turn directions to return the user to the selected location and/or provide address information for that location. Additionally or alternatively, from the computing device 200 (e.g., that has access to the website or community features of this invention and to which the watch device 100 or module 104 may be connected for data exchange), the systems and methods could be programmed and adapted to provide maps or directions to the selected location, to provide information about the businesses or other items of interest at or near the selected location, to direct the user to a website of the noted business(es) or other items of interest at the selected location, etc.

"Markers" and "way points" of the types described above may be used for other purposes as well. For example, during a run, a user might interact with the watch device 100 in a predetermined manner (e.g., as described above) so as to "mark" one or more segments of a run route or locations along the route. For example, a single marker or way point may be entered at an appropriate location to mark the beginning and ending point of a lap (e.g., for a circuitous route run plural times during a performance, such as a run around a lake or a run around a block). Then, systems and methods according to this invention could automatically store data relating to the lap time (or split time) and provide this information to the user. Once entered, the same lap start/stop point marker also can be used for future runs around the same circuit (alternatively, different start/stop points could be entered whenever desired). The lap timing data also may be stored and used to provide challenges (e.g., challenging a user to beat his/her best lap time, beat the best lap time of a third party (e.g., friend, community member, others), etc.). Such "best time" data may be stored by the user or another (e.g., within the community or on the website, when uploading data to the website, when downloading data to the watch, etc.) and downloaded to the watch 100 for use when a particular route is run, or it may simply be stored on the watch 100 (e.g., for the watch user's best time).

Figure 15B:
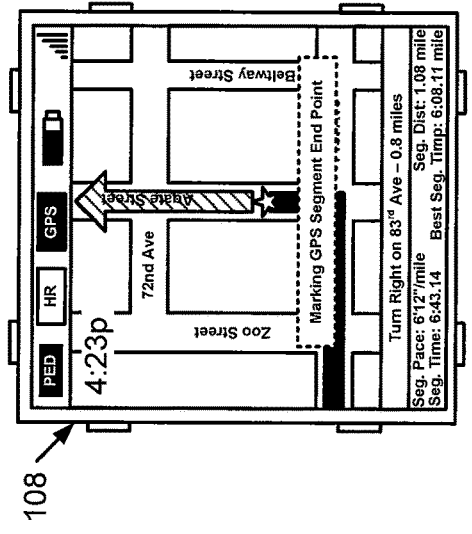
Figure 15A:
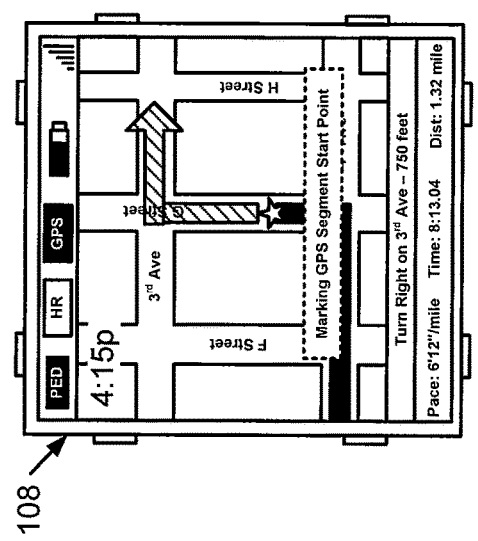

As another example, multiple markers could be entered to define segments of a route (e.g., portions of a route), and the challenges and/or other features as described above may be applied to these segments as well. FIGS. 15A and 15B illustrate examples of such marking. As shown in FIG. 15A, a GPS Segment Start Point is being marked, and in FIG. 15B, a GPS Segment End Point is being marked (e.g., by appropriate user input to the watch 100 during the run). If desired, systems and methods according to the invention may allow users to create their own name(s) for specific segments of a route (e.g., "Killer Hill") and/or for an entire route (e.g., "the lake run"). Alternatively, these segment marker locations could be made on the computer 200 prior to the run, e.g., using map or other features available through the computer interface 204a and then downloaded to the watch 100 during data exchange. The user's timing data over this selected segment can be compared over the course of many runs and/or with data from other users over this same route segment.

The stored marker locations and run segments may be used in other ways as well. For example, the locations and segments may be used to generate public or private challenges that other users of systems and methods according to this invention may receive when they interact with the on-line or networked community (e.g., via the website). If a user runs a regular route (or a few regular routes), systems and methods according to examples of this invention may look for segments along that route that are run by others within the community and/or determine whether any challenges or best times for a route or segment are present on the website. Using the GPS data, such segments also could be determined by systems and methods according to the invention without the need for a user to specifically enter or mark beginning and ending points for the segment. This segment and challenge data could be downloaded to the user's watch 100, optionally without the user knowing, and then the challenge could be presented to the user through the watch display 108 as he or she is involved in the athletic performance. For example, when GPS data indicates that the user is approaching $1^{st}$ Avenue, the controller within the watch 100 may be programmed and adapted to prompt the user for the challenge (e.g., "Your friend Bob's best time from $1^{st}$ Avenue to $20^{th}$ Avenue is 13:32. Want to see if you can beat that time?"). If the challenge is accepted (or optionally, automatically, without the need for acceptance), the user's time can be recorded for that segment, and optionally, other parties within the community or a user's predefined group can be informed of the user's attempt to break the best time mark and his/her results (e.g., after the run is completed and the watch data is uploaded to the community website system). Users, their friends, the general on-line or networked community, coaches, trainers, system operators, and/or others may make up challenges and store them in an accessible manner for use by themselves or others.

As noted above, one way of generating a "marker" or "way-point" (which stores GPS positional data associated with the marked location) involves a user interacting with his/her watch at the desired geographic location (e.g., by tapping the display, pressing a button, making a gesture, etc.). If desired, markers or way-points also may be generated using the computing device during an on-line or networked session (e.g., using the website). In either instance, systems and methods in accordance with at least some examples of this invention further may allow the user to insert or otherwise modify information associated with a marker or way point (e.g., using the networked resources after a workout is completed). For example, users could add notes, tags, pictures, audio, video, text, etc. associated with the various markers or way-points. These additions may be used for various purposes, for example, to provide reminders to the user who originally entered the information or to provide information to others that might be considering using the same route or a portion thereof (e.g., to help them select a route or determine whether a given route is appropriate), to other users on the route or segment, etc. As one example, a user may approach a complex intersection during the course of a run, and it might not be perfectly clear to him or her which road should be followed to stay on the desired route or to continue on to the desired location. If a previous user of this route stored some information associated with this location or marker, such as a picture (a highlight or pointer), a recorded message ("take the far left road"), a textual message, or the like, this may help that user later, as well as other users of the route, to better stay on the desired route path. Any desired information could be stored and associated with way-points or markers without departing from this invention, such as route condition information, shopping or other stop recommendations, local facility information, tourist information, etc. The stored information also could provide strategy for running along the approaching portion of the route (e.g., "really push it for the next half mile because an easy downhill section is coming up soon").

Because the watch 100 can be programmed to store various noted markers, way-points, or segments (e.g., by tapping the screen or another user interaction), the watch 100 also can be programmed to take action the next time the user approaches that location. For example, systems and methods according to at least some examples of this invention could challenge the user as he/she approaches a previously marked segment (marked by the user or another) to beat the previous "best time" or to reach a predefined "goal" on that segment (e.g., to beat the actual user's best time or another user's best time). Such features, after the data is uploaded to the community website, allow systems and methods according to this invention to generate and receive public challenges, run virtual races (e.g., using data from one or more runners that ran the route or segment at different times), and/or provide rewards or positive feedback when challenge attempts are successful.

If desired, different types of gestures or interactions with the watch device may be used to mark different types of markers or way-points. For example, types of way-points may be distinguished from one another by creating one way-point using a single tap, another using a double tap, another using a triple tap, another using an arm motion gesture, another using a combination of taps and/or gestures, another using a press-and-hold action on the crystal, etc. These different types of input may allow a user (as well as systems and methods according to this invention) to later distinguish one marker or way-point from another (e.g., to provide a reminder to the user when they wish to enter data about the way-point), so that different and the correct types of data can be associated with a given marker or way-point. For example, if all way-points entered on a route were a single tap type except one (which was a double tap type), a difference in appearance or other feature of that way-point when displayed may trigger the user's memory and remind him or her why that way-point was entered (e.g., "oh yes, I saw this great little coffee shop across the street," etc.). Such information may help the user find the location at a later time (or otherwise associate the proper information with the specially marked way-point), as described above.

Figure 16:
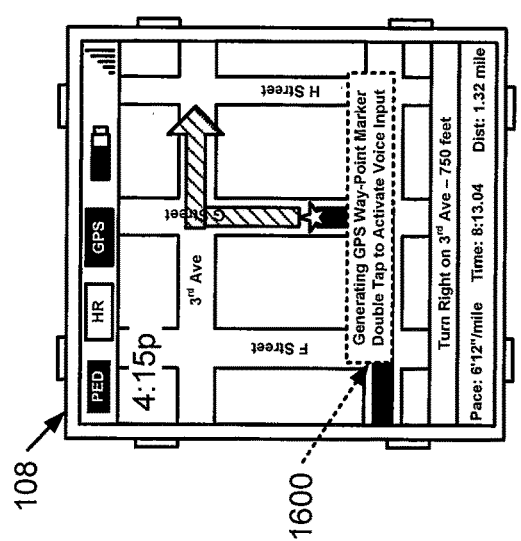

FIG. 16 illustrates another example feature that may be associated with GPS based markers or way-points. As shown, when a user interacts with the watch 100 to create a GPS marker, the system may provide the user with an opportunity to immediately enter input information, e.g., using voice or audible input. In this illustrated example, when a GPS way-point marking procedure is activated, the display screen can ask the user if he/she would like to activate a voice recording or input system (see dialog box 1600). A suitable response to this inquiry could activate a microphone 110 (see FIGS. 1A and 1B) and enable the user to record information and associate the recorded information with that way-point. This information could be played back to the user when he/she interacts with the community website system via the computer 200 and/or when the user later again passes this same way-point location (as determined by GPS).

Figure 17:
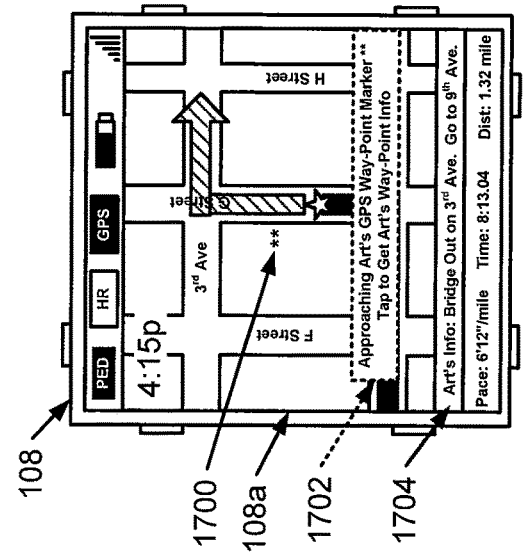

As noted above, the watch 100 (or other portable device carried by the user during the performance) may include an interface display 108a that shows features of the route (e.g., like a map, a satellite (or other) image, etc.). The interface display 108a also may include graphics to show the locations of markers left by the user (or by others), particularly markers that include some desired information relating to the route associated with them. This feature is shown, for example, in FIG. 17 by icon 1700. As the user approaches the location associated with a geographical marker (e.g., as determined by GPS), information relating to the marker could be provided to the user, either automatically or after the watch 100 receives a reply to a prompt presented to the user during the performance. For example, as shown in FIG. 17, as the user approaches the way-point marker 1700 location, the watch could beep or vibrate and display in a dialog box 1702 a prompt such as "Want way-point info?" If the answer is affirmative (or automatically), the way-point information (which may be left by anyone in the community) may be displayed, at least temporarily, for example, in the display bar 1704 (e.g., temporarily replacing the route bar 604).

Figure 18:
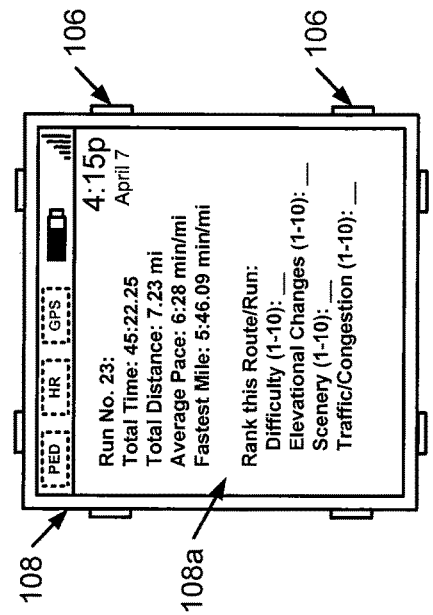

Systems and methods in accordance with at least some examples of this invention may be programmed and adapted to give the user an opportunity to enter information into the watch, e.g., upon completion of the performance. For example, as shown in FIG. 18, the system and method could be programmed and adapted to accept input (or prompt the user via display interface 108a to enter input) rating various features of the route just completed. The rated features may include, for example, the user's subjective rankings of various features of the route, such as difficulty, views (aesthetics), notable elevational changes, availability of facilities (e.g., drinking stations, public restrooms, child care, public transportation, etc.), road conditions, lighting conditions, remoteness, etc. As one more specific example, if a user decides to enter rating information at the completion of a performance, the watch 100 may prompt the user to rank (e.g., between 1 and 5) the various categories noted above, e.g., stepping the user through each specific category and asking for his/her ranking for that category. The user may input data using buttons 106, a touch screen, etc. This information can be stored locally on the watch 100 and then later uploaded to the web site or other community interface (if desired) so that others can take advantage of this user's experience with, opinion of, and knowledge of the route. Optionally, after the ranking information is uploaded, the user could be prompted to add more information or comments, if desired, that may be made available to the overall community or at least some portion thereof (e.g., to a user predefined group). The user's rankings may be saved with other information, such as the time of day ran, the weather conditions, the direction ran, etc.

Figure 19:
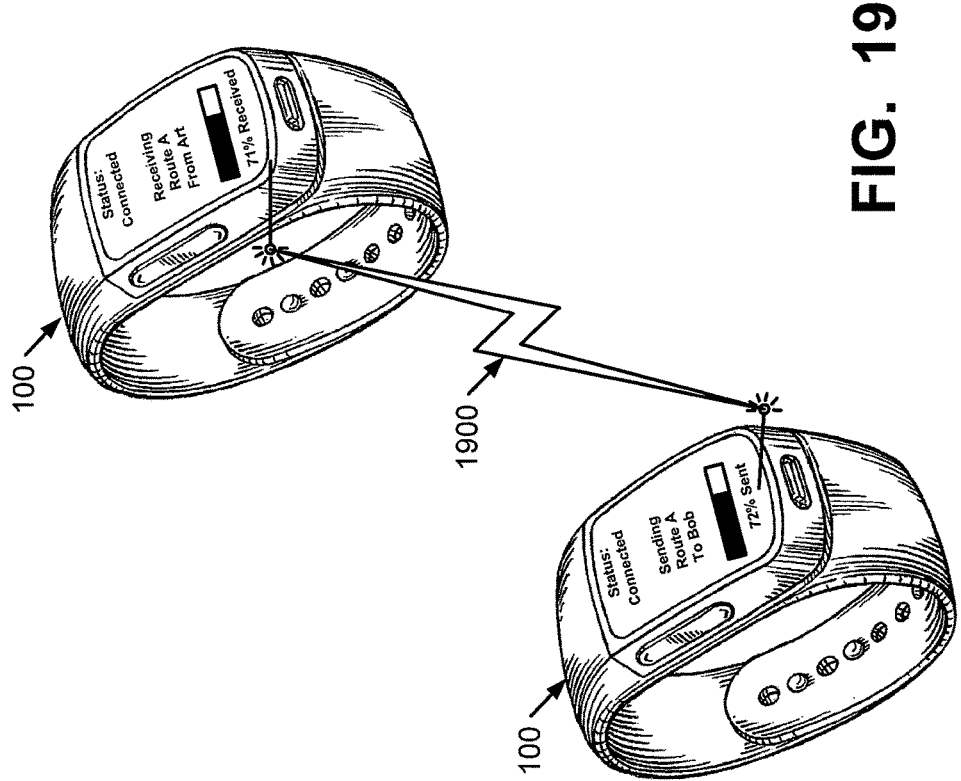

The actual portable device (e.g., watch 100) carried by the user during the athletic performance optionally may include other hardware and features as well. For example, as illustrated in FIG. 19, if desired, two watches 100 (or other portable devices) may include hardware and software to allow them to directly communicate with one another without the need for the website, network, and/or any intermediate equipment (e.g., a peer-to-peer communication type system, such as an IR beam transmitter and receiver, instant messaging capabilities, etc.). This is illustrated in FIG. 19 by the communications connection icon 1900. In this manner, two users of systems and methods according to this invention may communicate directly with one another, e.g., to exchange routes, GPS based locational markers or way-points, GPS based challenges, GPS triggered route information, etc. If desired, when a route is conveyed in this manner, the beaming party's best time on that route (or one or more segments thereof) could be beamed as well and used to automatically set up a challenge to the receiving party. If desired, a wired connection also may be used to facilitate this data transfer.

Figure 20:
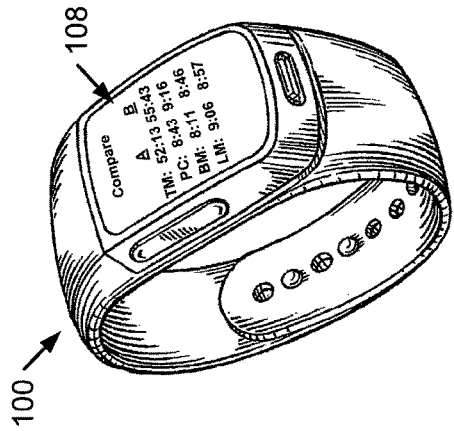

Direct watch-to-watch communication as shown in FIG. 19 may be used in other situations as well. For example, after a race is completed or after two (or more) users have completed the same route, one user could transmit his or her performance data to another user's watch 100. Then, the receiving watch 100 may be programmed and adapted to provide some type of comparison of the two parties' performance data. This comparison may take on any desired form without departing from this invention. For example, as illustrated in FIG. 20, the display screen 108 may display a comparison of the two parties' various race metrics (e.g., overall time, average pace, top pace, best mile, lap times, split times, times between markers or way-points, etc.), e.g., in a side-by-side relationship, in a table, in a scrolling or rolling fashion, in a graph, in a "results board," etc. As another example, if desired, the receiving watch 100 could be programmed and adapted to display a virtual race between the two users, for example, by moving different icons (representing the different racers) around a graphical representation of the route displayed on the device 100. Such systems and methods can be very useful to allow racers to make a direct comparison of their results, optionally while still at the event, even if their starting times were staggered or even if the users ran the route at completely difference times. While FIG. 20 shows a comparison of the results of two users, any number of results can be compared without departing from this invention.

Figure 21B:
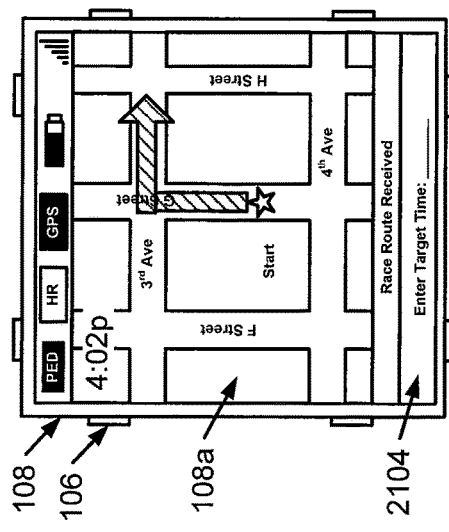
Figure 21C:
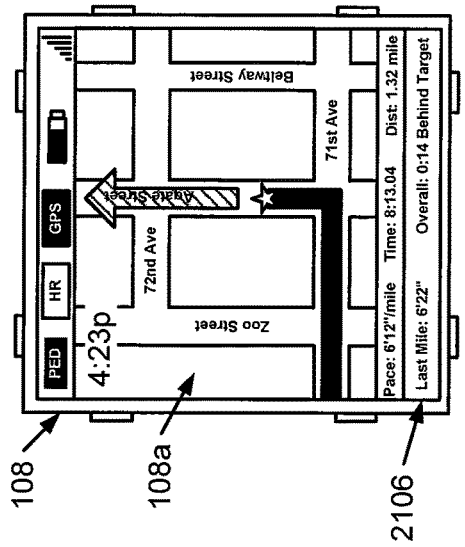
Figure 21A:
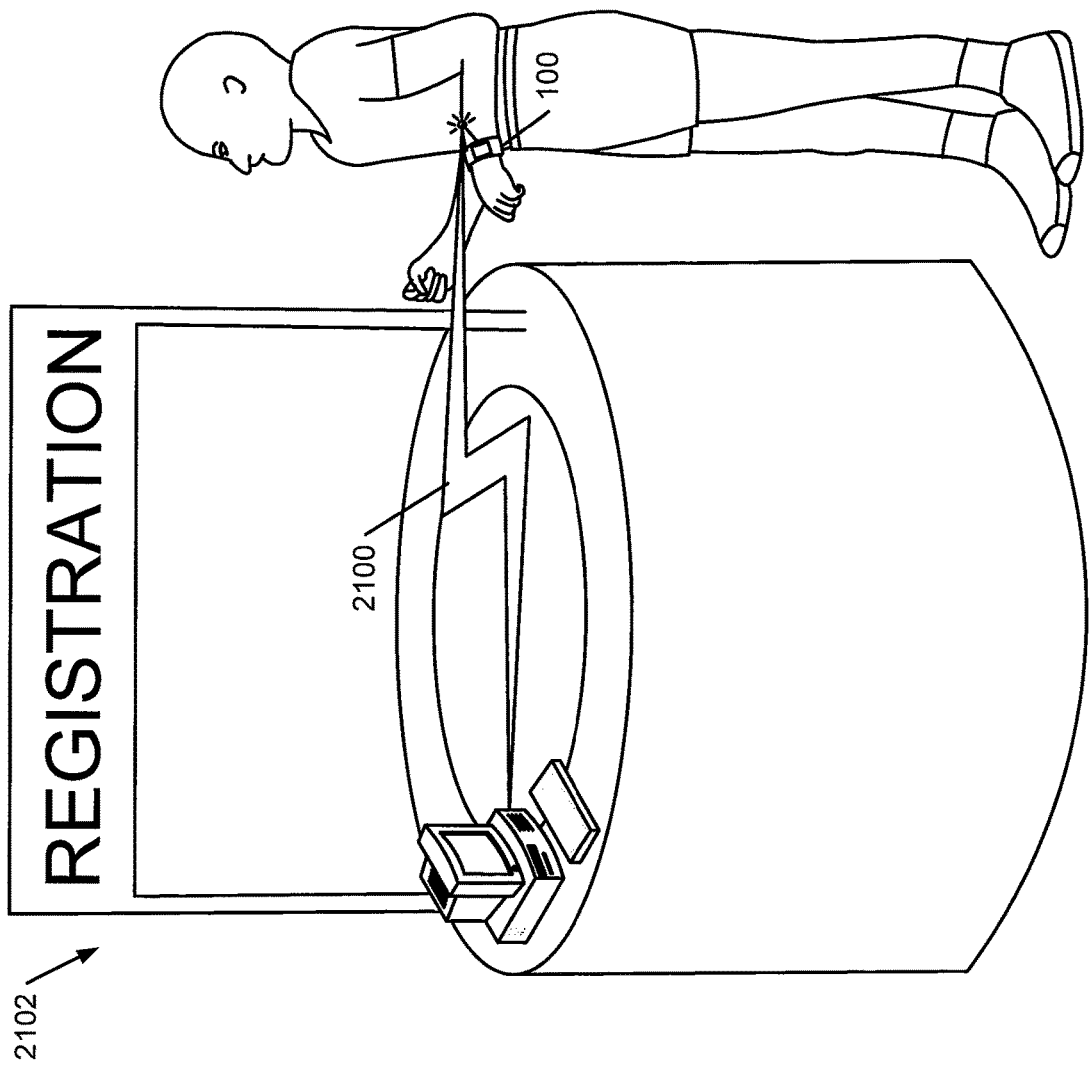

As other potential features, as shown in FIGS. 21A through 21C, watch devices 100 in accordance with at least some examples of this invention may be equipped, programmed, and adapted to receive data at an event, such as data relating to a race course directly transmitted to the watch 100 when registering for the event on the day of the event. This is illustrated in FIG. 21A by the transmission icon 2100 (wired or wireless communication) at a registration kiosk 2102 sending information to the watch 100. Once received, the watch 100 could be programmed and adapted to prompt the user to enter a target time for the event (see interface element 2104 in FIG. 21B, which represents the watch interface 108a at a pre-race time), or a target time could be pre-stored in the watch 100, such as through watch inputs 106 or user input downloaded to the watch 100 from the website system. The watch 100 then could be programmed and adapted to help the user pace himself or herself to meet the desired timing goal, set up desired split times to reach the goal, produce an estimated time for completion of the race or segment based on the current and past paces, etc. See, for example, the information provided in dialog box 2106 in FIG. 21C, which represents the watch interface 108a during the race. Optionally, if desired, the pacing and/or timing data could be determined taking into account stored information about the user's recent training performances and geographic characteristics of the race route and the user's training performances (e.g., to more accurately predict pace and estimated times for running hilly or flat sections of the race day course or for early in the event v. late in the event, the pace and target split times generated by the watch's controller may take into account stored data generated by the user when running similar terrain or similar race lengths while training).

As noted above, watches 100 (or other portable devices carried during an athletic performance) in accordance with at least some examples of this invention further may include hardware and functionality so as to allow the watch to receive user input in various forms (e.g., buttons, touch screen, gesture recognition, stylus input, roller ball input, etc.). If desired, these portable devices 100 also may be equipped to accept verbal or audio input. During an athletic performance, a user could speak into a microphone 110 (e.g., provided as part of the watch hardware as shown in FIGS.

1A and 1B, operatively coupled to the watch 100, engaged with an input port on the watch 100, etc.), and the watch 100 could store the audio message. Also, as noted above, this type of audio input may be tagged to the specific geographic location at which it was entered (as determined using the GPS data). The user could use the recorded message during later review or upload of the performance data (e.g., on the website), e.g., to produce route tips (e.g., "run on the north side of Jefferson Road to avoid the big dog"), to produce reminders or encouragement (race related or other), to identify points of interest along the route, etc. As another example option, the recorded audio could be stored on the watch and played back to the user the next time he or she approaches the same geographic location.

Watches or other portable devices in accordance with this invention may include any feature, combination of features, or all of the features described above, as well as other features and functionality, including features and functionality described below.

User Experience on the Computer (e.g., Computer 200) Connected to the Network The inclusion of GPS based features in systems and methods in accordance with at least some examples of this invention will result in the inclusion of various additional features on the user interface 204a for a website, such as the Remote Site 306 described above, or other computing environment in which the athletic performance data can be reviewed, processed, or the like and in which enhanced or other functionality can be accessed (e.g., a website feature similar to that publicly available at www.nikeplus.com). Some more specific examples of these features and functionality will be described in more detail below. Also, if desired, some or all of these features and functionality (or a somewhat modified or reduced version of these features and functionality) may be made available directly on the watch device 100 and its interface 108a and display 108 without departing from this invention.

As one more specific example, systems and methods in accordance with at least some examples of this invention may include various calibration features that are available to users. As noted above, athletic performance monitoring systems that include both GPS capabilities (116/118) and pressure or impact sensing pedometer type functionality (e.g., sensors 122) or other speed/distance measurement functionality may be programmed and adapted to use the GPS data and information to provide and produce calibration or correction data for the pedometer based sensor 122 (or other sensors).

Figure 22A:
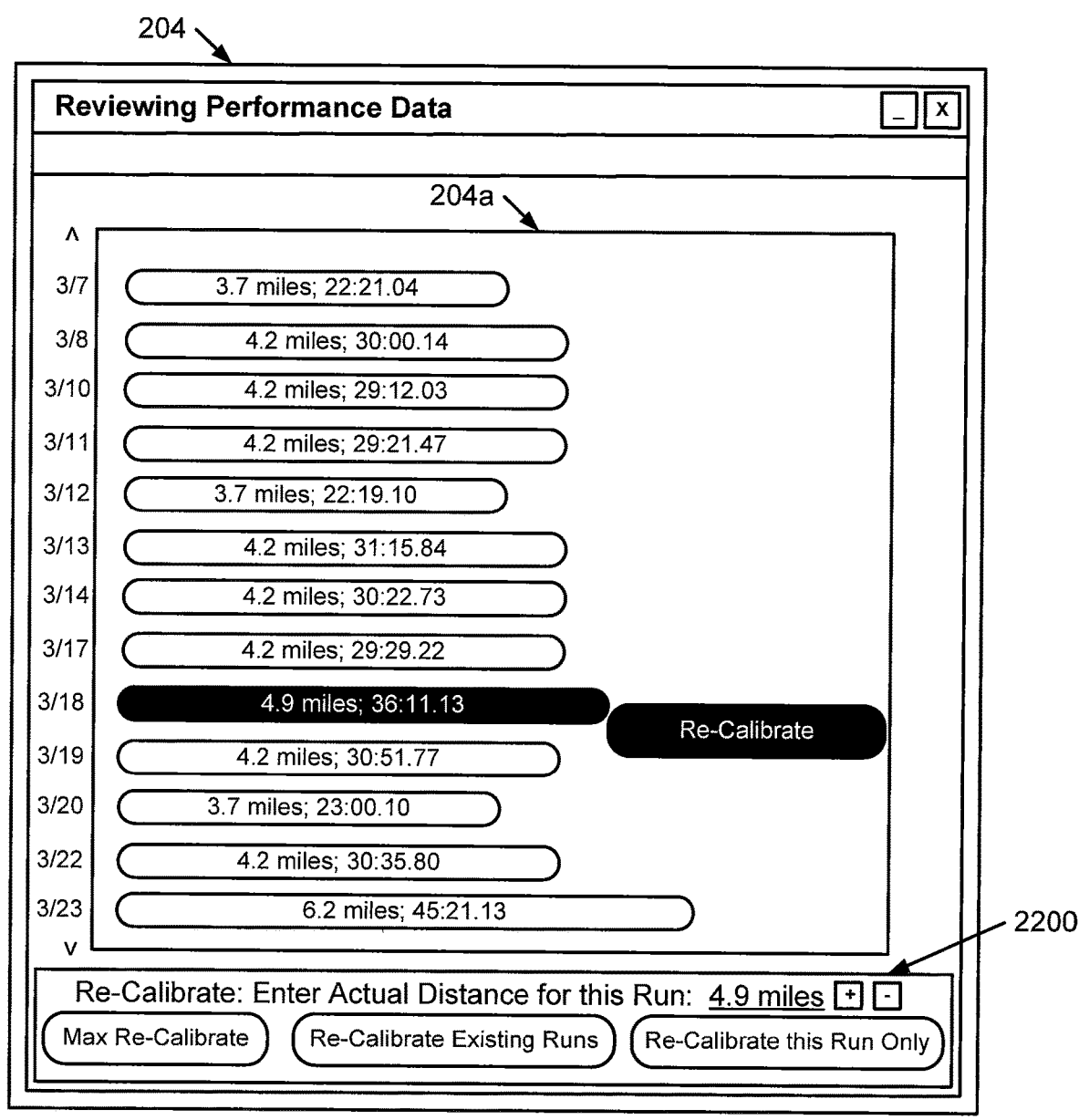
Figure 22B:
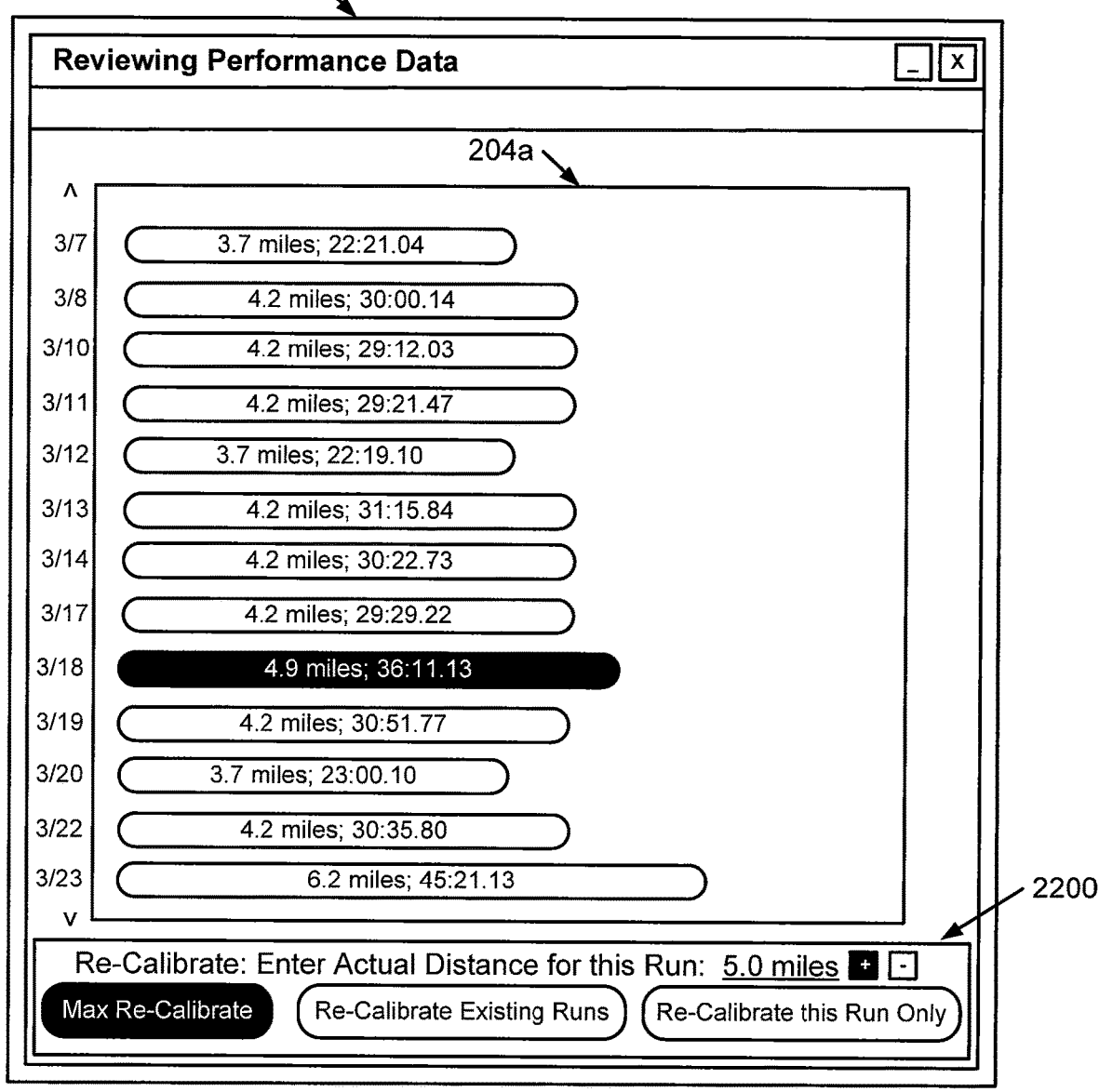

Additional calibration or correction functionality is possible with systems and methods in accordance with examples of this invention. For example, systems and methods in accordance with examples of this invention may allow a user to use data from newly posted runs for calibration or correction of other earlier runs. At a given time of an athletic performance, the user may not have known the precise distance of the run (e.g., if a run was made without GPS availability). That distance may later become known to the user in some manner (e.g., by measuring it, remembering it, obtaining it from another source, obtaining it from later GPS readings on the same route, etc.). If desired, through the interface 204a, as shown in FIGS. 22A and 22B, the user could go back to the data relating to that run and insert the now known distance for that run. As shown in the example interface 204a of FIG. 22A, the user has selected the ⅗₁₈ run (4.9 miles; time: 36:11.13) for calibration or correction. This selection provides an interface box 2200 in which the user can adjust the distance for that run. As shown by a comparison of FIGS. 22A and 22B, in this example, the user changed the distance of the ⅗₁₈ run from 4.9 miles to 5.0 miles. Then, in this example arrangement, the user must decide the extent to which to use the data for this run for recalibration or correction purposes. For example, as shown in input interface box 2200, the user could use this data to recalculate the distances and other metrics for this run only, for any existing uncalibrated runs, for any existing runs (calibrated or not), for "maximum recalibration" purposes (i.e., use this data for past runs as well as for future runs), for correction only of data that included this same route, etc. Moreover, if necessary or desired, information from this recalibration or correction command may be downloaded to the watch 100 and/or to the sensors 122 to recalibrate their output. Once the desired level of use of this recalibration data is selected, systems and methods according to this example of the invention could then make corrections to the data for that run, as well as other applicable runs (e.g., at least those runs made on the same or similar routes, under the same or similar performance conditions, etc.), and adjust the pace, speed, and/or distance data for the applicable run(s).

Data for this type of "after the fact" calibration or correction of pedometer data may be received from sources other than the original runner of the route (i.e., other than the person with whom the run data is associated and whose data is being corrected). For example, if Runner A runs a route (e.g., without benefit of GPS) and learns that another runner (Runner B) with GPS has run the same route (at the same or a different time), then Runner B's distance information via GPS may be used to correct the distance of the Runner A's data and/or to calibrate Runner A's pedometer data for future use. If desired, systems and methods according to at least some examples of this invention may collect distance data from multiple users associated with a specific route and use this collection of data (e.g., an average, a median, etc.) as the standard or default distance for that route and for calibration purposes, for multiple and future users of that same route. The data for calibration can be applied after the fact, on historical data, and/or for forward use for multiple users.

Figure 23A:
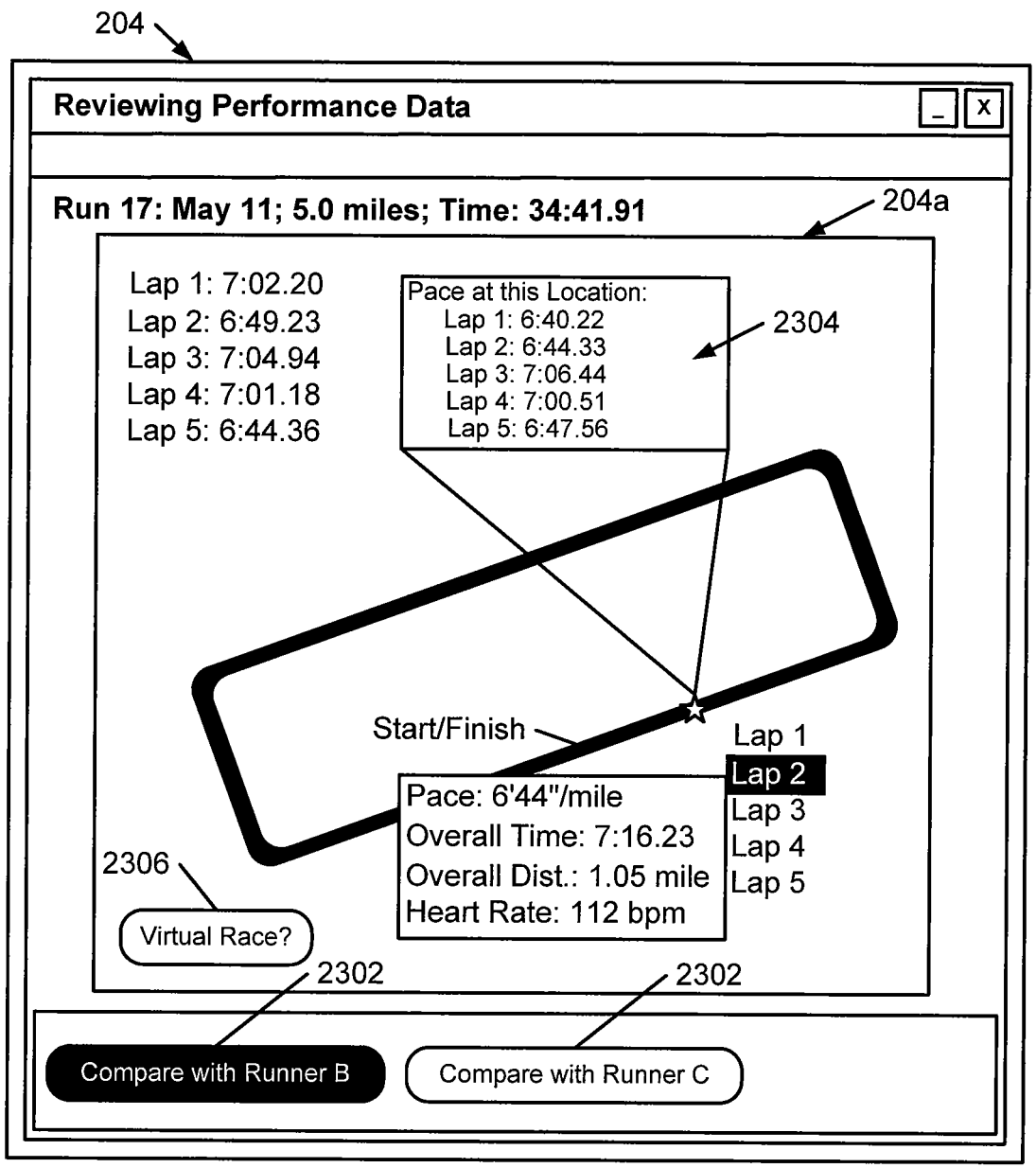

Using GPS, systems and methods according to at least some examples of this invention can automatically record and display data relating to laps around a circuitous route, such as a track. One example of such a display interface 204a is shown in FIG. 23A. In such a display, instantaneous speed, distance, pace, or other data associated with the athletic performance may be geographically and chronologically tagged (using the GPS and chronograph data), so that data at various different locations around a lap can be saved, compared, etc. Moreover, data at specific locations over plural laps can be saved, compared, etc., e.g., as shown by interface element 2304, to give the user a better idea of the changes in his or her performance at various different locations, over the course of the performance (e.g., as the distance grew longer, as the overall running time increased, at the same "top of the hill" location, etc.). Such data may be useful for training, coaching, etc. In the same manner, information associated with various user created markers or way-points (such as pace data between markers, etc.) also may be viewed and otherwise interacted with through the website (e.g., to add data, pictures, photos, audio, video, text, graphics, animation, etc.).

Figure 23B:
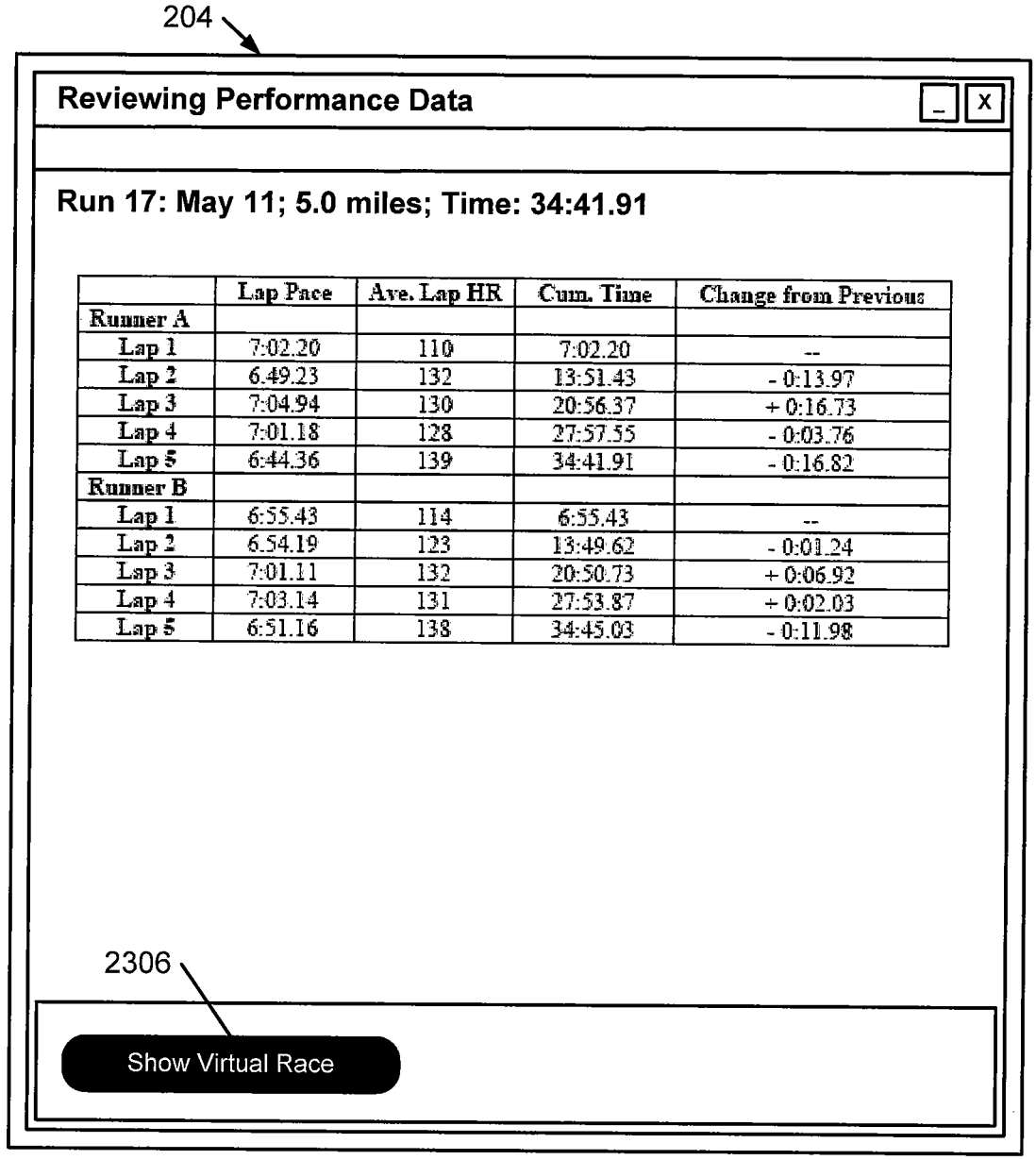
Figure 23C:
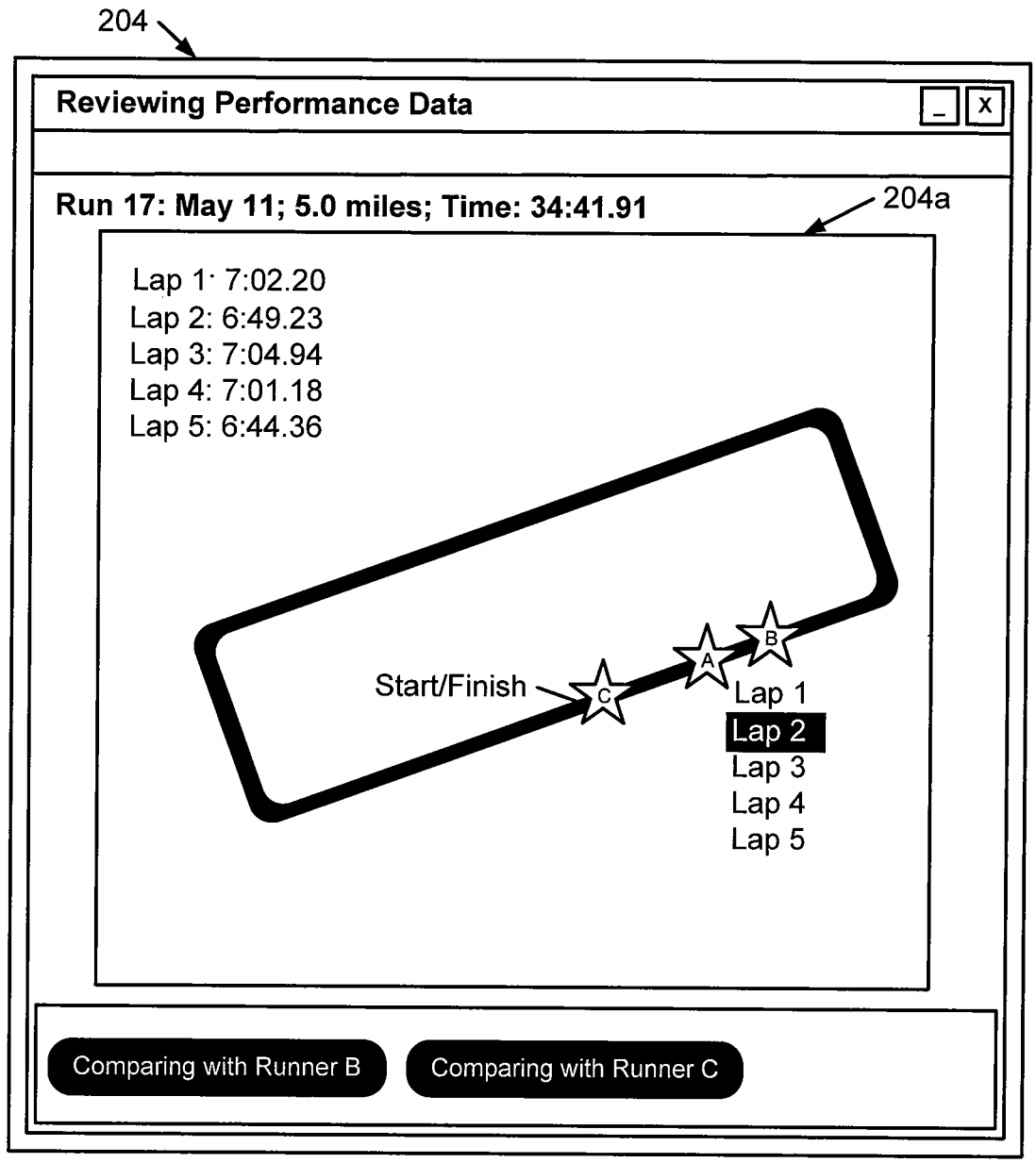

Multiple trips between the markers or way-points, by one or more users of systems and methods according to this invention, may be viewed, compared, and/or otherwise processed, e.g., by other users on their watch or through the website. One example display 204 of such information over multiple laps for multiple users is shown in FIG. 23B. The information in FIG. 23B may be launched, for example, by user interaction with one or more comparison icons 2302 shown in FIG. 23A (the data for any desired number of runners may be compared without departing from this invention). Additionally or alternatively, if desired, a user may interact with a "virtual race" icon 2306 shown in FIGS. 23A and 23B to display the virtual race between any selected time sets (e.g., race timing data of multiple users, race timing data for two different performances by the same user, etc.). Different icons or avatars representing the various virtual race participants may be displayed on the race route (e.g., a map or other representation of the route) with the locations of the virtual race participants (and desired number of participants) controlled by that participant's athletic performance data. An example of such a virtual race between three runners is shown in FIG. 23C. Such virtual race data may allow users to compare their performances against others at any desired time, even when the races were run at different times (or optionally, even at different locations).

Figure 24B:
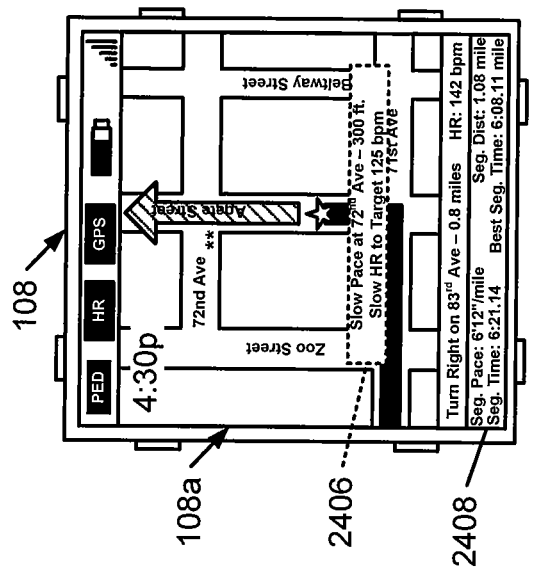
Figure 24A:
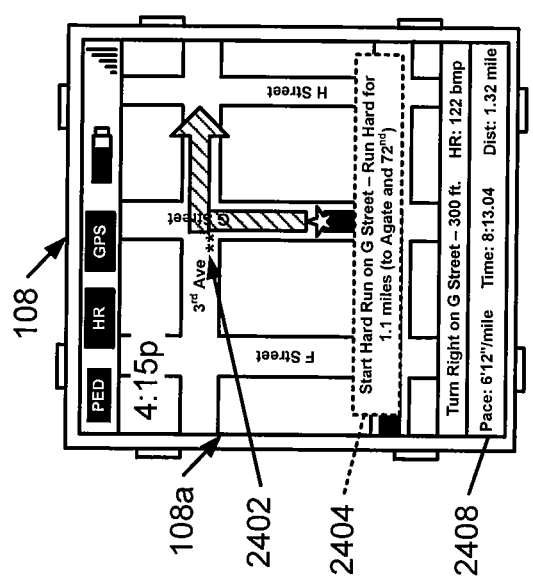

GPS functionality also may be useful to set up (e.g., on the website via interface 204a) and automatically provide to the user (using the watch 100) an "interval" or other coaching or training program, which would provide the user with prompts (via the watch 100) as to when to begin a run, begin a hard run, stop the hard run, begin another hard run, etc. One example is shown in FIGS. 24A and 24B. As shown in FIG. 24A, as the user approaches one predetermined location (illustrated by icon 2402), the watch display 108 will include a dialog box 2404 to provide coaching or training instructions (this information also could be conveyed audibly, for example, over headphones). In this illustrated example, dialog box 2404 prompts the user to begin a hard run at G Street which will last for 1.1 miles. At the end of this segment, the watch display 108 will include a dialog box 2406 to provide different instructions to the user. In this illustrated example, dialog box 2406 prompts the user to slow his/her pace and to slow the heart rate to a target of 125 bpm. Notably, in this example, at least toward the end of the high pace segment, the performance bar 2408 changes from providing instantaneous pace, overall time and overall distance information (FIG. 24A) to providing segment based information (see FIG. 24B and the displayed segment pace, segment time, segment distance, best previous time on this segment information). Any desired type of information and changes to the displayed information may be provided (including no changes in the displayed information) without departing from this invention. Additionally or alternatively, if desired, any of this information may be provided in another manner, such as audibly (e.g., over a speaker or headphones, etc.). The various steps in the interval or coaching program may be set up by the user; the user's coach, trainer, and/or physician; and/or by a computer algorithm.

Systems and methods in accordance with at least some examples of this invention may allow users to control various settings and features of the GPS system, the collection of GPS data via the watch, and its use of the data in data processing available through the watch or website, etc. For example, appropriate interfaces and data may be presented to the user, via the website, that will allow them to control various GPS related features of systems and methods according to this invention, including the various features described above. Some more specific examples of GPS features that may be controlled via the website include: GPS data polling frequency (e.g., to control battery usage); activation or deactivation of GPS features on the watch (such as turning on "turn-by-turn" route instructions, automatic marker placement, etc.); GPS assisted calibration features; marker or way-point insertion, editing, or control; GPS assisted challenges or rewards (such as messages for third parties with a geographic tag, messages for oneself with a geographic tag, etc.); etc.

Figure 25B:
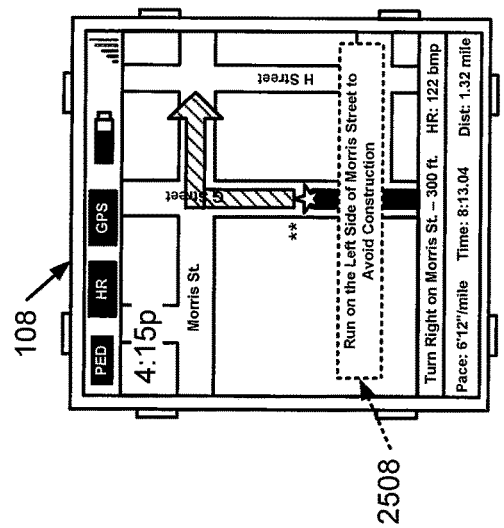
Figure 25A:
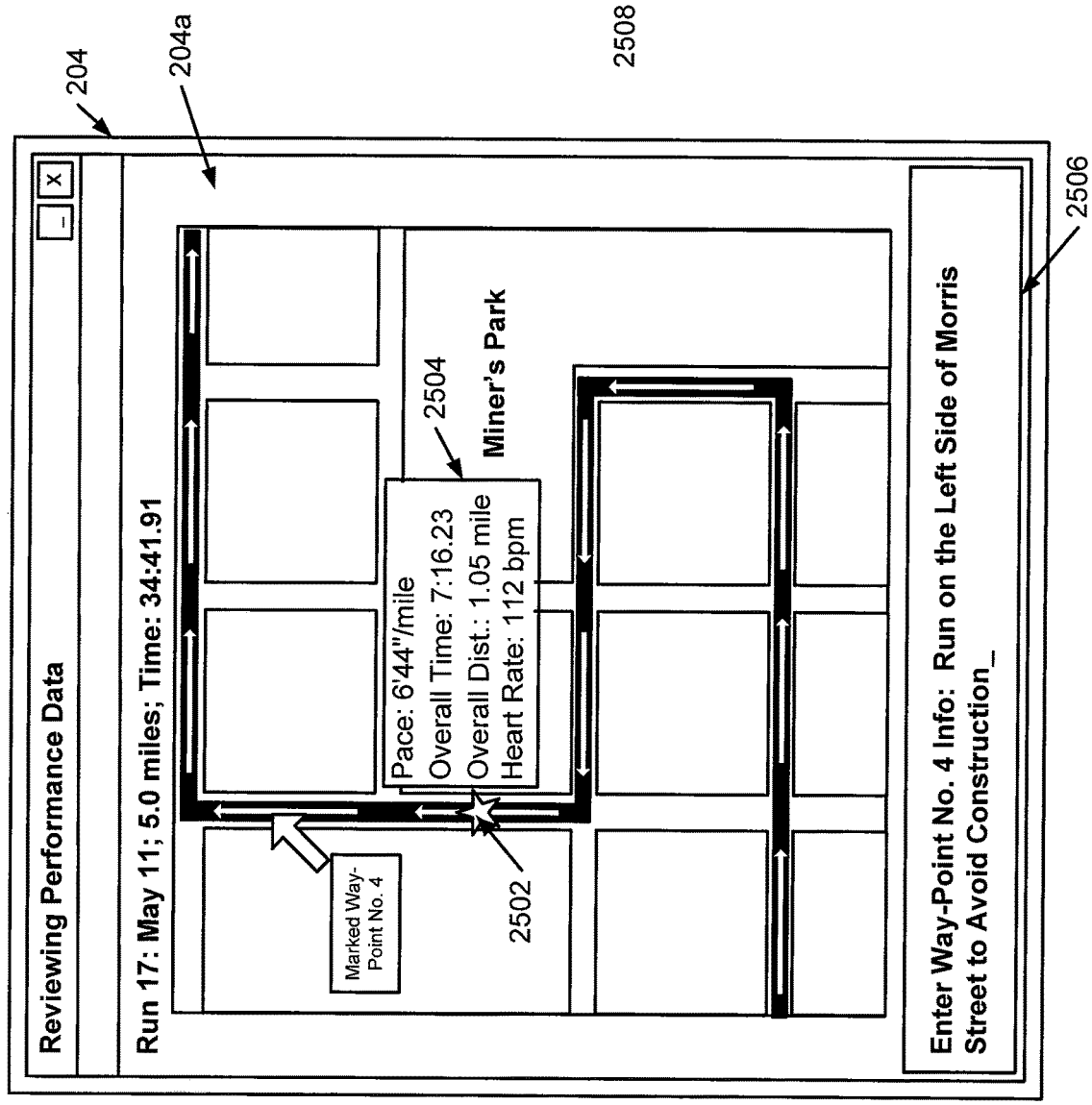

The inclusion of GPS data relating to the run routes also allows viewing of the run data on the watch (or other portable device) to be enhanced in various ways. For example, data and visual indicators relating to the runs may be superimposed or otherwise incorporated into renderings of maps, satellites pictures (e.g., Google Earth street view type pictures, etc.), or other graphical or pictorial representations of the appearance of the route. This is illustrated, for example, in the example display screen 204 of FIG. 25A. The user interface 204a of this example, including the presentation of the route on the display 204 (e.g., and optionally on the watch display 108a), may include map or other visual representations of the route in which the user is presented with "nodes" or other ways of interacting and/or "drilling down" at specific locations to get athletic performance data relating to that location (e.g., instantaneous pace, heart rate, pulse rate, pace up to that location, time into the race, time remaining, deviation from target pace, etc.). FIG. 25A shows one of these "nodes" 2502 with the data (e.g., timing, physical, and/or physiological data) associated with that location displayed in interface box 2504.

As noted above, the website features of systems and methods in accordance with at least some examples of this invention allow multiple users to share information, such as timing data, route data, challenges, etc. The systems and methods further allow users to share subjective information about routes or portions of routes, such as path type (trail, road, asphalt, concrete, stony, narrow, etc.), changes in path type, path condition information (e.g., "road construction has closed this block, go around it"), route difficulty information (and possibly different route difficulty information for one way around a route v. another or other ways around the route), scenic view information, running tip information (e.g., "run on the north side of the road for this block," etc.), facility information, etc. Any desired information may be entered by users and associated with a route, marker, way-point, route segment, or the like, without departing from this invention. For example, as shown in FIG. 25A, the website interface 204a may allow a user to enter information for the various marked way-points, such as Way-Point No. 4 illustrated in FIG. 25A. The information to be associated with this geographic tagged way-point may be entered, for example, via appropriate user interaction at input box 2506. In this illustrated example, route suggestion information is provided via input box 2506. Then, when this user (or other users) approaches this tagged way-point location (either on the same run route or a different run route from that used by the initial user that entered the geo-tagged information), their watch display 108 will display the suggested route information at box 2508, as shown in FIG. 25B.

The information entered by users (e.g., associated with markers, way-points, marked route segments, routes, etc.) may be searchable by others (e.g., keyword searchable) to help better inform potential users of a route of the general characteristics and/or other information associated with that route. If desired, users can keep their individual information entered into the system private or available to only selected other users (e.g., persons designated as "friends," etc.).

As noted above, when several parties use athletic performance monitoring systems and methods according to this invention, a community of users and a collective knowledge and information database can be uploaded, stored, and maintained (e.g., at one or more separate servers, akin to the community aspects of the athletic performance monitoring systems and methods available from NIKE, Inc. of Beaverton, Oreg. under the trademark NIKE+). If users take the time to input information into the system, the knowledge and information from one user can benefit other users. For example, systems and methods according to examples of this invention may automatically, or through purposeful user input, collect data relating to various features of routes and users that ran the routes, such as the time when various individuals ran the route, the days on which they ran the route, the gender of the runner, the conditioning level of the runner, the direction that they ran around the route, the distance of that route from a specific location, route difficulty information, route elevational change information, subjective information (such as scenic beauty, facilities information, runner comfort information, etc.), etc. This type of information may be entered into the data system in various ways, such as by rankings, using predefined colors or code words ("black diamond," etc.), or simply as textual words or information. Such information (which then may be searchable) can be helpful for users that are traveling or new to a location (or new to running).

Other interesting features and advantages of the community aspects of systems and methods in accordance with this invention relate to the ability of persons to define groups of friends or training partners that may be granted at least some level of access to one another's performance data. The community and data sharing aspects of this invention can lead to a wide variety of challenges and other interactions between friends and partners that may be entered into systems and methods according to examples of this invention via the website or other networked user interface (e.g., available through a computing device to which the portable watch is connected for data upload and download). As some more specific examples, user's can develop challenges between one another that can help motivate and maintain interest in a workout program (e.g., most miles this month, most consecutive days staying on a specific training program, challenges on specific routes, challenges to make an elevational climb or run to a specific location, etc.). Also, as noted above, through systems and methods in accordance with at least some examples of this invention, user's can leave geographical based "rewards" or "carrots," such as verbal messages of encouragement or congratulation, that are downloaded onto a user's watch 100 (either with the user knowing of this download (as a motivational tool) or not knowing it (and will be surprised when the reward is activated)). Then, when the user reaches the predetermined location, as determined by GPS, the reward or carrot message will be activated (e.g., the watch may display, "Congratulations—way to get up that hill!"). As noted above, triggering of such a reward may be controlled so as to require at least some threshold workout performance so that the user cannot "cheat" to get the reward or otherwise inadvertently get the reward (e.g., by requiring pedometer sensor data output indicating a predetermined workout time or distance, etc.).

Users also could make up motivational games that rely on GPS locational information. For example, systems and methods according to this invention might track the number of times each individual within a group (e.g., a group of friends) reaches a goal, such as completing a 6 mile run, running to the top of a hill (optionally within a predefined timing and/or distance parameter), etc., and the system and method could identify those that accomplish the goal and provide this information to other members of the group (e.g., by a display, audio/video output, etc., when users within the group log in on the network, etc.). As another game, users could play "geo-tag" wherein the most recent user within a group to reach a geographical destination goal (e.g., the top of the hill, "King of the Hill," etc.) is identified for the group. A wide variety of GPS, geographical based motivational games and challenges may be developed for individuals, selected or predetermined groups, or the entire overall community of users without departing from this invention. Again, other sensor output may be monitored to assure that the goals are reached via actual workouts and not accidentally or in some other manner.

The inclusion of GPS data relating to the run routes also allows viewing of the run data on the website to be enhanced in various ways. For example, as noted above, data and visual indicators relating to the runs may be superimposed or otherwise incorporated into maps, satellites pictures (e.g., Google Earth street view type pictures, etc.), or other graphical or pictorial representations of the appearance of the route. The systems and methods also may be programmed and adapted to provide a "fly-through" preview of a route, e.g., on a map (e.g., street level, topographical, etc.), on satellite or other photos, etc. As additional examples, the systems and methods also may be programmed and adapted to provide a "fly-through" review of an actual run along route, e.g., on a map (e.g., street level, topographical, etc.), on satellite or other photos, etc., optionally with an avatar, picture, animation, or other graphical representation of the runner on the route. If desired, users may be allowed to add their own pictures or other data to enhance the depiction of the route (e.g., by uploading pictures or other images of themselves, of the scene (e.g., for non-road views, such as trails, etc.), etc.).

The website and networked aspects of this invention also are advantageous, along with the repeated connection of the watch device with the network to upload performance data, because these features allow users to readily receive software and firmware updates for the user interface to the computing device (e.g., downloadable to and through the computing device to which the watch is connected) and to the watch that connects to the computing device. These features can help keep the users up to date and provide the most recent advantages and features for both the interface and the watch.

Using the website and user interface features 204*a* from the computing device 200, users can also predefine various location based markers, way-points, or segments on a route of interest to them. For example, using the website features, systems and methods according to examples of this invention may be instructed to always mark a segment from one locational position to another (e.g., "from the end of the bridge to my house") and automatically take timing information for that segment. During the run, if desired, the user could be prompted when approaching this predefined segment and/or optionally challenged to beat their best time for the segment (or the best time of another who ran the segment, etc.). Providing the capability to mark such segments on the website and automatic activation of the desired functionality when these segments are approached helps the user avoid the inconvenience of marking segments using the watch device 100 and/or repeatedly marking the same segments or otherwise interacting with the watch 100 time after time when the route is run. This capability also makes the comparison of data for the segment more meaningful and accurate because the same starting and ending points are always used.

Another advantageous feature that may be provided in systems and methods in accordance with at least some examples of this invention is the ability to develop "one way routes." In some instances, a user may wish to run to a location that is beyond their normal one way run distance or beyond their capabilities for reaching in a round trip workout. In other words, if the user ran to that desired location one way, it may be beyond their ability or desire to also run back on the return trip (or the return would take a long time should they walk, etc.), for example, due to distance, elevational changes, available time, etc. This can hinder a runner's ability to challenge himself or herself and/or may adversely impact his/her enjoyment of the outing (e.g., if scenic views are located more toward the end of the route). Systems and methods according to at least some examples of this invention may allow a user to create a route via the interface 204a including a starting location and an ending location and then have the systems determine suitable public transportation directions or information (e.g., bus routes and schedules, subway routes, taxi calls, etc.) for the return trip to the starting location (or to another desired location).

Systems and methods in accordance with at least some examples of this invention also may be programmed and adapted to allow insertion and storage of information relating to workout "types" (either automatically or through user input). Much of the above discussion utilizes running as an example of the type of workout conducted. Systems and methods according to examples of this invention, including various GPS features and functionality as described herein, may be used for other types of workouts, such as biking, swimming, walking, hiking, mountain climbing, rowing, driving, skiing, yachting, etc. If desired, for an individual workout, the workout type may be defined or input into the system (e.g., on the watch 100 before the workout begins or after it ends, on the website after the workout data is uploaded, etc.). This may be accomplished, for example, by providing the user with a list or "drop down" type menu from which the workout type may be selected. As another example, the workout type may be automatically detected, e.g., by considering the GPS location of the event (e.g., if on water, it is defined as a swimming, rowing, or yachting event, depending on the movement speed as determined by GPS or other; if on land, running or biking, depending on the movement speed as determined by GPS; if during the winter, skiing if at a mountain location, etc.). In at least some instances, the type of path also may be automatically detected using GPS and map data (e.g., road, sidewalk, trail, water, ski hill, park, etc.). The workout type also may be automatically detected based on various features, such as the type or characteristics of the non-GPS sensor output generated to measure the speed and/or distance (e.g., sensor output indicating a running step will appear different from sensor output indicating movement on an elliptical machine, a bicycle, a rowing machine, etc.), etc. Automatic detection of workout type also may be made possible by interaction or data exchange between the watch 100 and the equipment being used during the workout wherein the watch is able to discern the identity of the type of equipment being used by ID data transmitted to the watch (e.g., different ID data from a bicycle v. oar locks v. skis v. elliptical machine v. pedometer, etc.). If errors in workout type determination are made by the automatic detection system, a user may be given the ability to override and correct the data.

Systems and methods according to at least some examples of this invention also may allow users within a community setting (e.g., among a group of friends) to automatically discover routes or segments of routes run by others in the overall community or group. As a more specific example, routes run by some of a user's community or group also may be downloaded to the user's watch during a networked session. If that user later runs in a location close to a location of a friend's route (or segment of a route), as determined by the GPS data during the run, the watch may be programmed and adapted to advise the user that he or she is near the friend's route (or segment) and ask the user if he or she would like to run the friend's route (or segment) (e.g., the watch may display, "You are near a route that Friend A runs. Want to run it?"). Additionally, the friend's best time on that route or segment may be provided to the user as a "challenge." In at least some examples of this invention, the users need not take any action to have these routes downloaded to their watch (e.g., this could occur automatically during the data exchange while the user is uploading workout data from the watch to the website). As another example, systems and methods according to the invention could be programmed and adapted to automatically suggest other routes to a user (optionally having similar characteristics), e.g., from the watch or during a post-workout on-line analysis time period, based on a currently or recently run route and/or based on one or more previously stored routes. The suggestion and use of different routes can help keep the user from getting bored with their workout routine.

Figure 26:
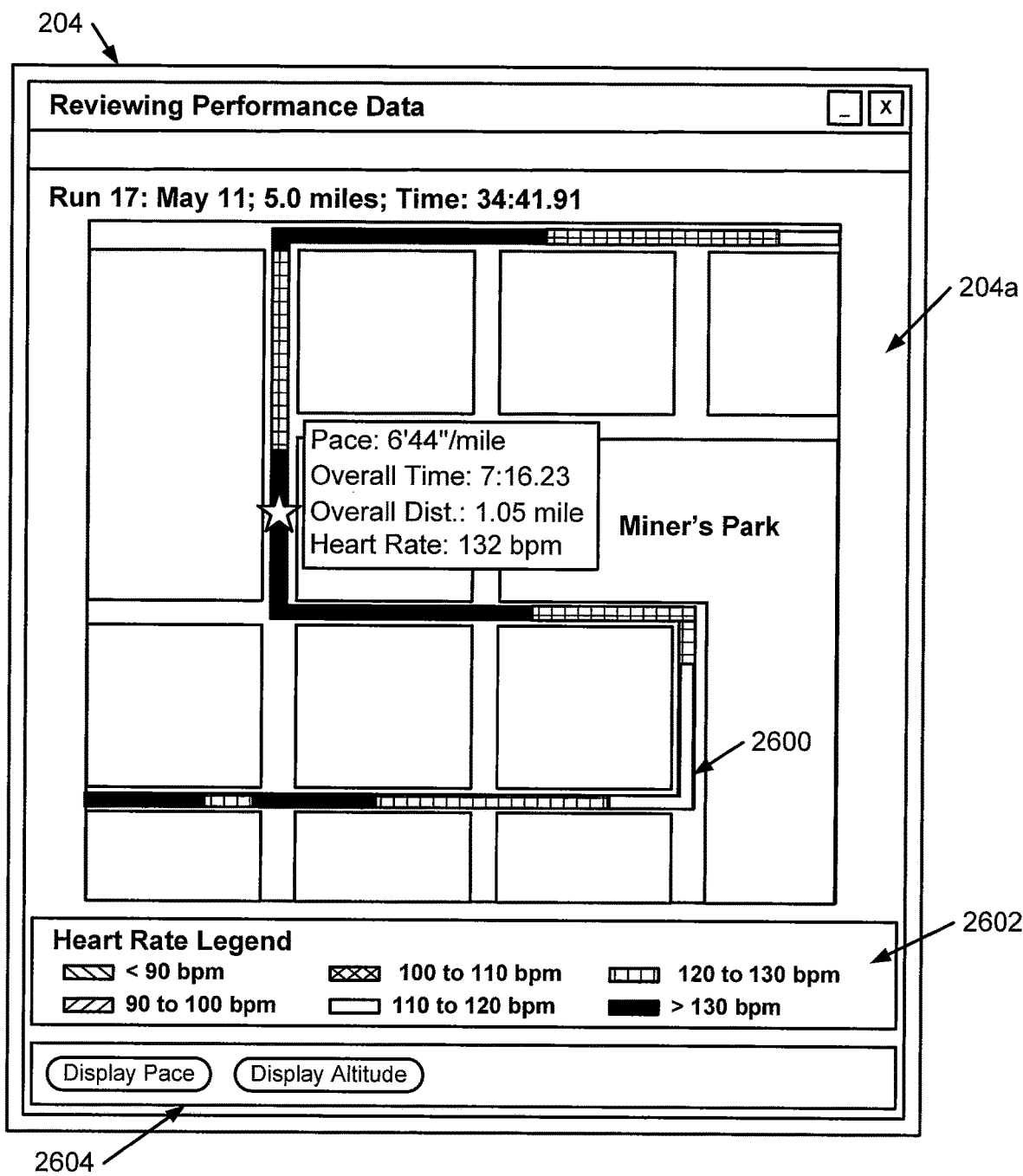

One potential feature of systems and methods in accordance with examples of this invention relates to the display of the workout data on the user interface (e.g., optionally overlaid on map or photo data, as described above). If desired, characteristics of the displayed run line may be coded to provide information to the user regarding the workout. FIG. 26 illustrates one more specific example. As shown in this figure, the color (or other appearance characteristics) of the route 2600 ran may be changed over the course of the displayed run route to indicate different physical or physiological features or characteristics of the route and/or the athletic performance. Additionally, the legend 2602 provides information to allow the user to correspond the displayed color to one or more specific features of the run, such as heart rate range in this example. While FIG. 26 illustrates that the route color is changed based on the determined heart rate at various locations along the route, other data and information may be provided. For example, the changes in route color may on the interface 204a may correspond to changes in pace, changes in altitude, etc. If desired, a user could have the ability to switch between different monitored metrics (or this could be accomplished automatically, such as by a periodic switch between parameters over time) so that at one time the representation of the route 2600 may be color coded for one metric (e.g., pace) and at a later time the route 2600 may be color coded for another metric (e.g., heart rate or altitude). An example of this feature is illustrated in FIG. 26 by the interface elements 2604 that allow the user to selectively change the displayed route 2600 between one parameter and another. As another alternative, if desired, the representation of the route 2600 could be split so as to simultaneously provide information relating to more than one parameter. Providing this information to the user along with the representation of the route 2600 can help provide valuable training or coaching information that can help the user improve his or her performance.

Additional Potential Features of Systems and Methods According to Examples of the Invention The inclusion of GPS or other athletic performance monitoring features in systems and methods according to this invention provides the capability of including still other features and functionality. Various examples of such features and functionality will be described in more detail below.

For people that perform certain activities (e.g., golf) or that run within a city or more populated areas, their "active time" during the performance may be of more interest than the overall total time spent in the activity. More specifically, during any given workout (including runs), the workout time may include at least two different time frames of interest, namely, a "total time" (e.g., from the time the workout mode is activated until it is ended) and an "active time" within that total time. These two time periods may differ for any of a variety of reasons, such as: stopping at crosswalks or red lights, pausing to talk to someone along the route, stopping to check or get directions, stopping to look at something along the route, stopping to hit a golf shot, waiting between plays or periods (e.g., in football, baseball, basketball, hockey, etc.), timeouts, sitting on the bench, resting, etc. These delays may cause undesired inaccuracies in the recorded data (e.g., not stopping the time counter during an unintended or unavoidable delay could substantially lower the pace determination). Accordingly, using the GPS system 116/118 and the pedometer type sensor 122 (or other sensors for other types of athletic activities), systems and methods according to at least some examples of this invention may determine when a user has stopped moving and stop the "active time" clock, but the "total time" clock may be allowed to continue running. In this manner, more accurate "pace" determinations can be made using only on the "active time" clock. Such a system may report to the user both the active time and the total time and give the user a choice of which time to use for the various calculations (e.g., "Your workout lasted 2 hours, but you only ran for 1.75 hours. Which time is more accurate for pace calculations?").

In some instances, when stopped (e.g., at a stop light, to talk, etc.), a runner will run or jog in place. Systems and methods according to at least some examples of this invention also can detect such action automatically, e.g., by noting that the GPS location has not changed substantially but output from the pedometer sensor continues to be generated indicating foot contacts with the ground. Optionally, a change in characteristics of the foot contact with the ground (such as a change in the dynamic foot pressure profile or the angle of foot impact with the ground) may be detected to indicate a difference between actual running and running in place. In such instances, to maintain more accurate data, the "active time" clock could be stopped (so as to maintain more accurate "pace" calculations), but the overall calorie burn count may be continued (perhaps with a different calorie burn rate) and the total time may continue accumulating.

This "auto-pausing" of the "active time" clock feature, however, may not be desired in all situations. For example, for races or other competitions (as opposed to general training or workouts) one would not want the "total time" clock to differ from the "active time" clock Accordingly, systems and methods according to at least some examples of this invention may allow the user to selectively switch on and off the "auto-pausing" feature. Alternatively, if desired, systems and methods according to at least some examples of this invention may automatically switch this feature on and off, at least in some instances. For example, if a race was being held at over a certain time frame and at a certain location and this information was downloaded to the watch, the watch could automatically detect if the user is at the specified location (using GPS), moving along the specified route (using GPS), within the noted time frame. If these features of a performance are detected and the expected performance metrics are measured or present at the given time, then the watch may be programmed and adapted to automatically turn off the "auto-pause" feature and only track the "total time" that the user participates. If the user's athletic performance takes place at a different time, at a different location, and/or along a different route, then the "auto-pause" functionality may be maintained (if the user desires it). In a multi-event workout, such as a triathlon, the auto-pause feature may be disabled so that all time is counted, even the time between active participation in the multiple events. Also, if desired, a "triathlon mode" may be provided so that the watch will automatically look for and switch between collecting swim type data, biking type data, and then running type data (or other data types for a specific combination of events).

Figure 27:
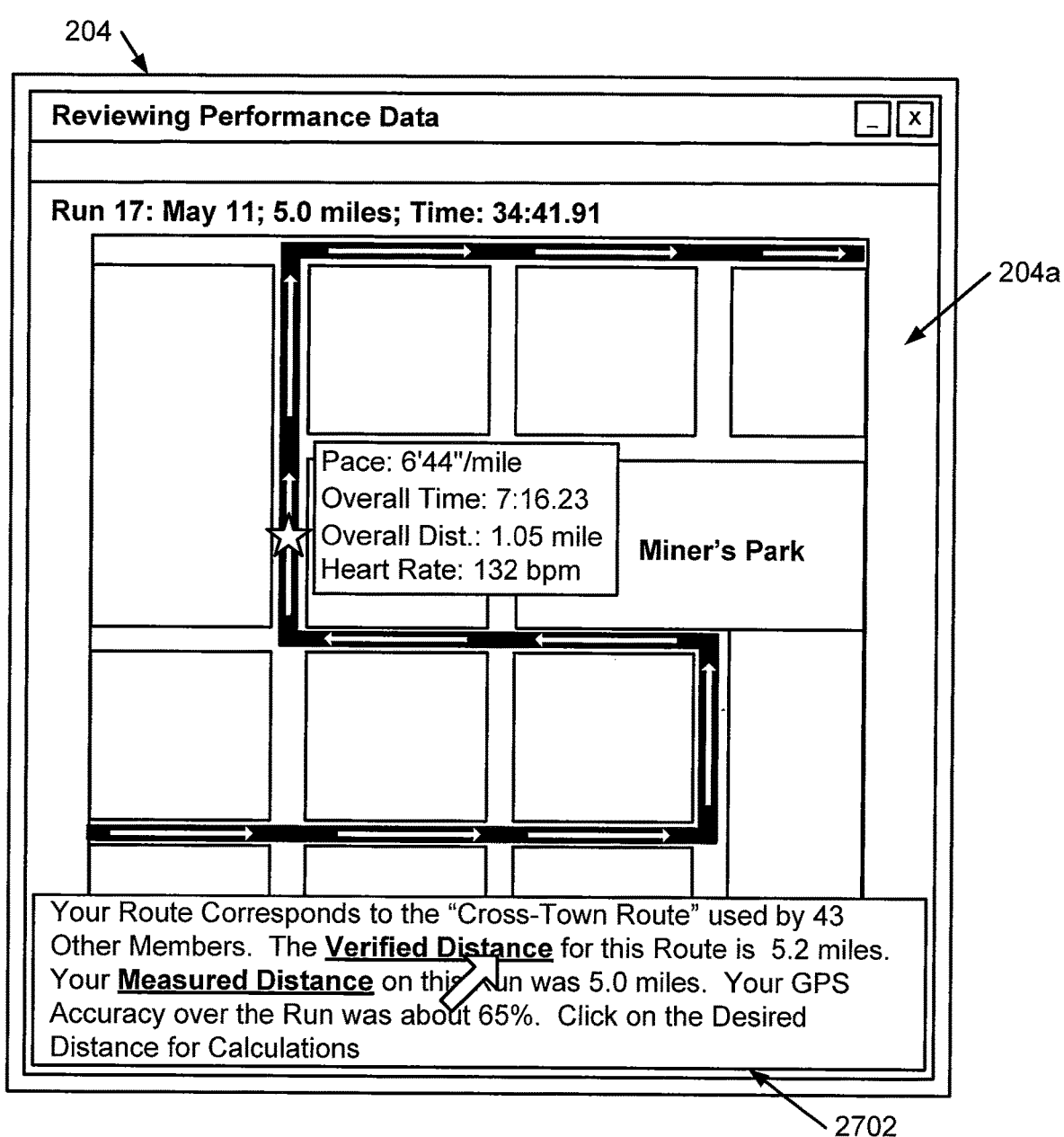

Various calibration features and functionality are described above. Even for a given route or route segment, however, the overall distance measured by the GPS system 116/118 or a pedometer system 122 may vary from one time to the next, e.g., due to where a person crosses streets, whether a person runs the inside or outside of a curve, GPS availability, etc. Systems and methods in accordance with at least some examples of this invention may use multiple sets of GPS and/or pedometer workout data for a given route or route segment (e.g., collected from one person or several people) to define an average or median "distance" for that specific route or segment (optionally a different average or median distance may be maintained for each direction in which the route or segment may be run). Once a desired level of data is collected for a given route or segment, the finally determined average or median distance may be used by systems and methods according to this invention as the "verified distance" for that route or segment for future calculations (for any users of systems and methods according to this invention, even users that did not have GPS data and only ran the route using the pedometer (assuming that they advise the systems and methods of the route taken)). FIG. 27 illustrates an example user interface 204a that includes such features. The data collected by the pedometer 122 and/or GPS 116/118 also may be checked and calibrated against this "verified distance" (even for users that did not run using GPS data, as noted above) so that more accurate data may be reported for that run and/or so that more accurate pedometer measurements may be made in the future, e.g., to provide better data when pre-determined routes are not traveled and/or when GPS data is unreliable or not utilized.

As another potential feature, systems and methods according to at least some examples of this invention may allow users to select a distance for a specific run or route (after the fact) from one of multiple potentially available sources. For any given run or route, several different sources of distance data may be available, e.g., the GPS system 116/118 data generated for the user during the run, the pedometer 122 data generated for the user during the run, community GPS or other data relating to prior measured data along that route (as described above), map data relating to that route, the "verified distance" described above, etc. After the run data is uploaded, the user may be queried as to which data source to use for measurement of distance on the route (and, optionally, which source is believed to be the most accurate). An example of this feature is shown by the user interface box 2702 of FIG. 27. If cloud cover, trees, or tall buildings may have compromised the accuracy of the actually measured GPS data for a given run, a user may decide that his or her pedometer data or independent map data is more accurate for that day's run. If the user believes he or she may have strayed somewhat off the assigned route at some point or if their run included several non-linear segments (e.g., zigzags, etc.), he or she may decide that their actually generated pedometer and/or GPS data is most accurate for that day's run. The presentation of measurements from several different distance measurement sources to the user may enhance the user's confidence in the data and the overall system. Users also could be polled (e.g., when using the website) to comment or rate the accuracy of the route distance as determined by GPS or the pedometer, the route directions, or other features of the route. This information may be used by the system operator to identify portions of their routes and the distances correlated to these portions that may need to be reconsidered or remeasured to enhance accuracy.

In some instances, the system may track the perceived accuracy level of various data, such as the GPS data (e.g., by marking a "confidence level" or GPS signal strength level at various geographically tagged points along the way), and automatically use other data (or the most "confident data") when the GPS data falls below a threshold level. Confidence levels of this type may determined for any type of sensor and other data may be used at appropriate times to assure that the most accurate results possible are being obtained.

Figure 28:
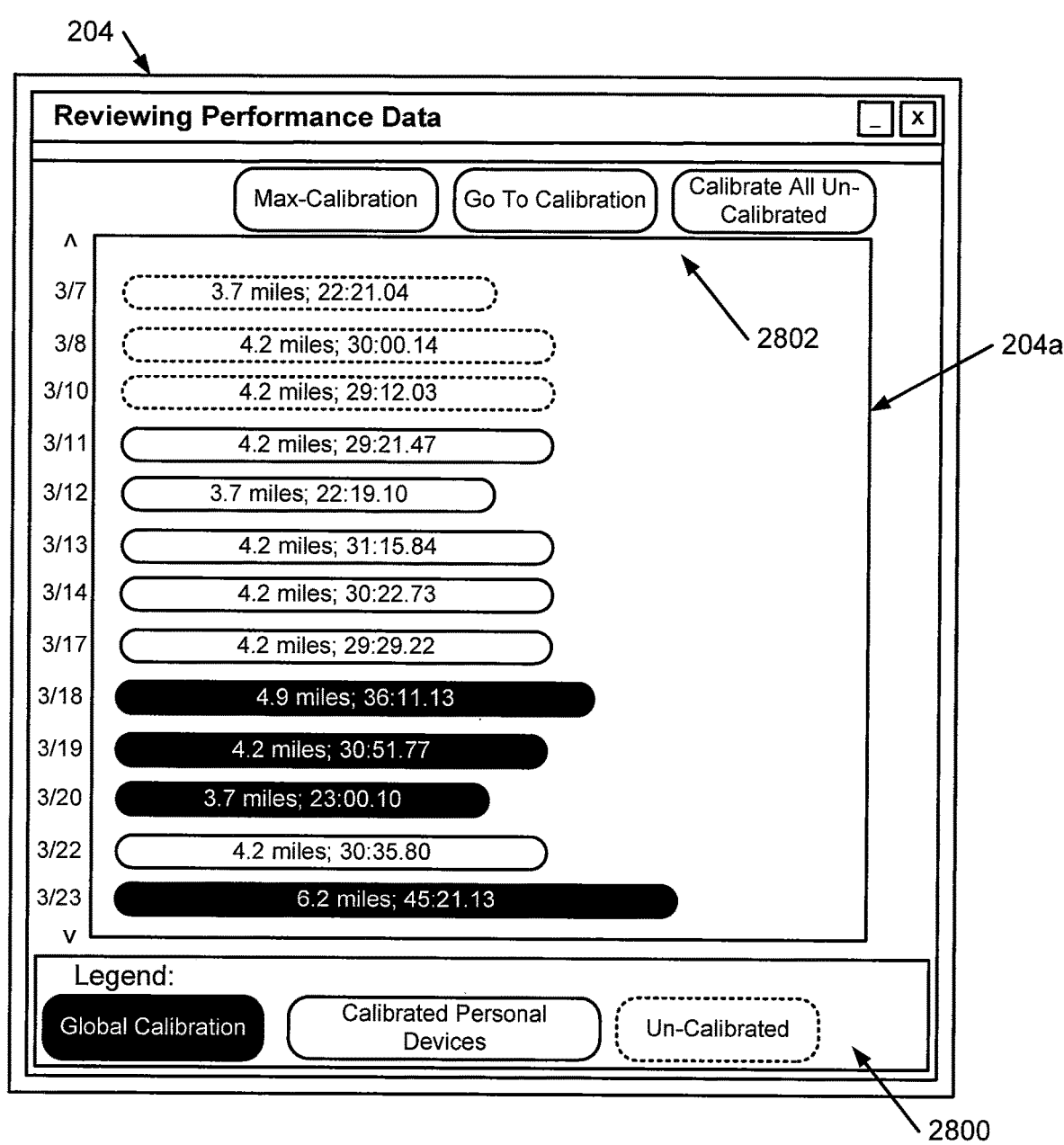

To encourage use of calibration features and to improve the overall accuracy of the data, systems and methods according to at least some examples of this invention may mark or display uncalibrated or uncorrected data on the website display different from data that has had its accuracy improved, e.g., via the various correction or calibration techniques described herein. FIG. 28 provides an example of such features. As shown in this figure, uncalibrated or uncorrected data could be presented in a different color (or other appearance feature) from calibrated or corrected data, a pop-up could appear advising that the data is uncalibrated and suggesting a calibration procedure, an audio or video indication could be provided, etc. As described above, various procedures may be made available in systems and methods according to this invention to calibrate or correct the data even after a workout is completed, and systems and methods according to this invention may use data generated outside of the actual workout and/or data generated by other parties to enhance any user's data accuracy. Therefore, when uncalibrated or uncorrected data is uploaded to the website, the interface 204a could prompt the user to correct the data (e.g., by displaying a message, such as "Want to auto-correct your measured data?"), and the user may be given a final opportunity to accept or reject the changes made by the auto-correction or calibration system.

FIG. 28 illustrates an example interface 204a in which the degree of calibration or correction of various runs is displayed (e.g., as shown in the legend 2800, the data may be un-calibrated, calibrated using the individual user's calibration technique, calibrated using global community information, etc.). The interface 204a may further provide various options to the user to calibrate the data, such as shown in interface area 2802, which may provide options such as: calibration or correction of all using global data, calibration or correction of all previously un-calibrated data, calibration or correction of one or more individually selected runs, etc. Any desired interface and interaction options may be provided for these types of data calibration/correction features without departing from this invention.

Moreover, such auto-correction or auto-calibration features may allow systems and methods according to this invention to build a profile of correction factors for measured distance data (e.g., as measured by the pedometer 122 or other sensors) based on various characteristics of the run. As a more specific example, calibration or correction information may be stored for a variety of different paces, altitudes, elevation changes, early in a run v. late in a run, user heights (which will correlate to stride length), user inseam measurements (which will correlate to stride length), user weights, etc. Then, for a new run, the conditions of that run (or various portions of that run) may be considered against the conditions noted for the various stored calibration or correction factors and the most appropriate calibration or correction factor(s) for the run (or a portion of the run) may be used in the correction procedure. Thus, plural correction or calibration factors may be applied to correct the data for a single overall run (e.g., one correction factor used for flat portions, another for uphill portions, another for downhill portions, etc.), and different calibration or correction factors may be applied at the same location for different users.

Another feature that may be available on systems and methods in accordance with at least some examples of this invention relates to downloadable event packages. More specifically, for public (or other) events, such as marathons, triathlons, or other races, the course for the event may be downloaded to the user's system (e.g., via the website or networked computing device). These events may be located anywhere in the world. Using GPS, map, or other data, systems and methods according to this invention may be programmed and adapted to look for running courses or routes within the user's geographic area (or other areas, such as when the user is travelling) that will help train the user for the event. As some more specific examples, specific segments of the actual event course may be matched to specific locations within the user's local area. As a more specific example for elevational changes, if the actual event has a 0.5 mile hill that climbs an elevation 125 feet, systems and methods according to this invention may present to the user one or more local routes that have similar characteristics, optionally at a similar overall time in the race process (e.g., early in a training run, in the middle of a training run, late in a training run, etc.). Route path type and change in path type for the actual event also can be considered and mimicked by proper selection of routes in the local area. Such local training routes may better help the user prepare for the actual race.

Training of this type (e.g., using mimicked route information for a future event) may be useful to the runner in other ways as well. Data relating to the training at these specific mimic segments may be used during the actual event to help better estimate the user's time of finish as he or she is running in the actual event. When the event time and date arrives, the watch 100 will automatically know whether the user is at the event (e.g., from time, calendar, and GPS data), and it can enter a "race" mode for the event. For example, the watch 100 may be programmed and adapted to provide the user with course directional data or other previously stored information relating to the event. Also, data from the above-noted mimic training runs may be useful to help systems and methods according to this invention to automatically determine better pace target and/or split times for various locations and segments in the race to allow the user to finish the race within a pre-defined target time. The watch 100 also may be programmed and adapted to display an estimated finish time (absolute time or race timing information) as the race progresses (taking into account past pace during the race and predicted pace on approaching segments, optionally based at least in part on the mimic training data). These pace target and/or desired split times may be provided to or calculated by the watch 100 and used to give the runner feedback during the course of the event (e.g., to provide real-time feedback as to the need for pace changes to meet a time goal, etc.).

Rather than (or in addition to) determining local routes that mimic the event route (or portions thereof), downloadable event packs of this type also may be used to program a treadmill to provide a suitable training run or program for the user. For example, the incline profile of the treadmill may be changed to match or train the runner for the actual event, and/or the speed of the treadmill may be adjusted to the desired or target pace for the actual event (e.g., to meet a predetermined time goal). As an additional feature, if desired, the treadmill may be equipped with a video display that shows movement through the actual event location as the runner "runs the course" on the treadmill.

As noted above, if desired, systems and methods according to this invention may prompt users or others to rate, rank, or provide information relating to various routes or portions of routes. Various rating, ranking, or other information may be collected, such as elevation change on the route, direction of travel on the route, length of the route, surface(s) on the route, availability of facilities, environmental factors (e.g., windy, scenic, wet, etc.), construction information, route detour information, etc. A common ranking or rating system may be provided so as to allow an easy comparison of different routes and/or to allow users to better select appropriate new routes for their capabilities. Any desired ranking or rating system may be used, such as a "star" rating (e.g., 3 star difficulty), a numerical rating (e.g., a class 4 route for elevation changes), a color-coded rating (e.g., a black diamond rating), etc. The data from plural individuals on a given route may be collected and the finally assigned rating or ranking may be determined from the overall sample of ratings or rankings (e.g., an average, a median, etc.). The community system also could provide a rating system for the user's conditioning so that users could look at route ranking information from the point of view of other users having similar conditioning characteristics. The individual users' conditioning also may be taken into account in determining the system rankings for various routes (or different ranking rates may be provided by the system for different levels of conditioning).

Even if a common ranking system is not developed that takes into account data from numerous individuals, ratings and rankings from individuals may be useful to others. As another possible feature, systems and methods according to examples of this invention may allow one user to compare his or her rankings or thoughts about a route to another party's rankings or thoughts about that same route. By seeing how this other party ranked a route known to the user, the user may have a better idea of the characteristics of other routes that were also ranked by this same party (e.g., it may allow the user to compare his or her characterization of a route to another's characterization of that route to see if they have similar rankings of route difficulty). The route ranking information also may be searchable, if desired.

As described above, using the community environment features of systems and methods according to examples of this invention, a great deal of data relating to many different workout routes may be generated and collected. Some users may not wish for the overall community to have access to information about the routes he or she runs, at least not on an individual level. Accordingly, systems and methods according to examples of this invention may give users the opportunity to "opt out" of having its route data collected and shared, or at least provide anonymity and/or control and limit the amount of data and/or the number of users with which the data is shared.

As additional potential examples, if desired, systems and methods according to this invention could provide routes to various users as rewards for certain achievements and/or as workout incentives. For example, persons that cover a certain mileage or distance (optionally within a specified time period) may be sent a "reward route" in their geographical area and invited to post a time to that route. Other features may be included with the reward, such as gifts, etc. Such routes could be sent to the watch 100 either directly or through the community network connection described above.

If the portable device carried by the user (such as watch 100) has direct communication capabilities (e.g., via cellular telephone, WiFi, WAN, or other communications technology), if desired, users could receive real time updates regarding various routes, e.g., based on their current location as determined by GPS. Such information could include weather information, emergency information (either local or personal emergencies, such as information transmitted by the user's spouse or another), local police activity information, etc.

Systems and methods according to examples of this invention further may provide an "effort" metric that will allow users to compare activities on different routes. For example, one user's run data may indicate a 2 mile asphalt route having a 200 foot elevation gain completed in 18 minutes, while another user's data may indicate a 1.9 mile trail route with a 252 foot elevation gain completed in 21 minutes. Metrics could be developed to determine which user expended more "effort" in their respective workout. In addition to distance, timing, path type, altitude, and elevation gain, other factors may be taken into consideration in determining the effort metric, such as the various user's weights, heights, conditioning history, etc., to arrive at a common metric by which these different routes and activities can be compared. Challenges could be developed using such effort metrics, e.g., such as challenges as to who can gain the most "effort metric" points within a given time period, etc. Effort metrics of this type could be used in a manner akin to handicapping in golf (or other activities), e.g., as an effort to provide a level playing field or a common scoring system for direct comparison to others of different capabilities.

As noted above, the stored routes and community aspects of examples of this invention also can be useful to help users select new routes and gain information about existing routes (e.g., to locate popular routes) within the database. Some of the information that may be stored relating to a particular route or portion thereof and may be made available to users may include, but is not limited to: the number of people who have run the route, the most popular time(s) of day the route was run, the most popular day(s) on which the route was run, the type of activity or activities on the route (e.g., biking, running, walking, swimming, boating, rowing, driving, etc.), navigational information relating to the route, the most popular direction to run the route (e.g., clockwise, counterclockwise), the percentage of people running each direction on the route, etc. This information can help users determine when they may prefer to run a particular route and/or how they may wish to run it.

When running or participating in other athletic performances, many users like to listen to the radio or recorded music, watch videos, and the like, to help keep them entertained during the performance. The inclusion of GPS in systems and methods according to examples of this invention may be used with this audio or video information to provide various options and functions. For example, during an athletic performance, songs or other information presented to the user during a run may be tagged with locational information from the GPS data. During later workouts, a user may desire to skip a song (or other information presented) and request the "next" song (or other information) be presented. Systems and methods according to at least some examples of this invention may be programmed and adapted to select the "next" song (or other information) from the songs (or other information) previously presented to the user at this same geographic location. Also, if desired, systems and methods according to the invention may mark the skipped song (or other information) so that it will not be presented to the user again, at least not at that specific location (or near it) or at least not during similar workout conditions.

Users of systems and methods according to examples of this invention may craft a song (or other media) playlist to match specific routes and/or specific paces. These playlists may be made available, e.g., to a user's specific group of authorized "friends," to the community at large, etc., and users of the system can search or browse the available playlists (optionally targeted to a specific route and/or targeted to a specific pace). If desired, others could download the playlist and/or purchase the playlist or the songs that make up the playlist, optionally, through the community interface accessed via computer 200. The GPS system could assure that the proper song is being played at the proper location along the route (e.g., assuming that the same general pace is run by the new user as was run by the original playlist creator).

As another feature, systems and methods according to at least some examples of this invention may be programmed and adapted to send the user run reminders (e.g., that appear on the watch display; audio, video, or textual; via email or instant messaging; etc.). If a user does not run for a while (e.g., for two days), the watch (or other device) may be programmed and adapted to then send a reminder. The reminders could be locational based on the GPS data (e.g., "You are near your Beacon Hill Route—Let's climb it!"), seasonal (e.g., "Spring is in the air—Let's run along the river!), humorous, scolding, goading, from a celebrity or coach, from a spouse or other person known to the user, etc. Any desired type of reminder may be provided without departing from this invention.

As yet another feature, systems and methods according to the invention could note when users consistently stray from a published route. If repeated deviations from a published route are noted, systems and methods according to this invention may at least temporarily change the stored route to correspond to the most commonly noted deviation or to develop a new route. Such repeated deviations may constitute an indicator that there is some sort of issue with the original published route, such as road construction, or the like, and this information may be used to trigger the system manager to investigate the current status of this route or segment thereof (and optionally provide updates and/or updated routes via the community website).

Other features of this invention may be developed as a result of the collected GPS data and the system knowing and/or determining the "routes" of various individuals. For example, because the system will know the routes that individuals use, it can tell those individuals of the use of that same route (or portions thereof) by others, such as who runs it, how many people run it, etc. Systems also could provide route "addendums" or "alternatives" to a person (either in real time or as part of the network connection), e.g., challenging the person to add to their route (such as by asking the user if they would like to add an extra half mile to the route and then automatically add it to the route using the GPS system if the challenge is accepted). This could be accomplished in real time (e.g., if the system can tell that an athlete is running at a good personal pace, it might suggest adding distance or picking up the pace to beat a personal best, etc.). Using the GPS features, the system could still get the athlete back to his/her home base or starting point even when routes are altered in the manner described above as an "on-the-fly" decision.

Because of the more global knowledge of routes from multiple sources, systems and methods according to at least some examples of this invention may be able to create new routes based on combinations of segments of existing routes (e.g., by combining portions of one route with another route, by adding routes together, by crossing from one route to another route, etc.). Intersecting routes or closely located individual routes (including trail routes) can be joined, in whole or in part, to make different options and different routes for the users. Making these types of alternatives available to users can help keep the scenery fresh and make workouts more enjoyable. If desired, these alternatives can be presented to the user on-the-fly, e.g., as various geographic points are approached, as determined using GPS.

If desired, systems and methods according to the invention can provide a "timing" feature. If a user inputs a time limitation to the workout (e.g., "I can only go for 45 minutes today"), systems and methods according to the invention can develop a route for the user to get him/her back to their home base or starting point within the desired time frame. This route could be developed, for example, using the runner's typical or historical pace, and furthermore, the route can be altered, on-the-fly, if necessary, to lengthen or shorten it, depending on the elapsed time and the user's current performance (e.g., including past pace). As another option, if desired, the watch 100 could accept input from the user, on-the-fly, asking to lengthen the workout or shorten the workout (e.g., a button 106 that allows the user to add or subtract time from the workout, optionally, in five or ten minute intervals). When this type of button is activated, the route can be changed automatically to accommodate the newly entered time frames (and the route presented can be modified accordingly).

Other "real-time" or "on-the-fly" features may be provided by systems and methods according to this invention involving the community and networked features of the invention. For example, if desired, the watch 100 could generate a signal that may be used to advise others in the community that an individual is currently running (or undertaking other activity). If desired, systems and methods according to this invention, using GPS data, could advise a user when he or she is geographically close to one of their friends during a run, workout, or race (e.g., "you are approaching your friend; catch her!"), optionally, only while that other person also is working out (e.g., as determined by GPS or other sensors associated with the other person). The system also could be used to schedule runs with others in the community or let others know your typical running schedule. As another option, for systems with communications capabilities on the watch device 100 itself, two geographically remote users working out at the same time may be allowed to communicate with one another (e.g., using a "push to talk" type feature or two-way radio type communications to send audio messages).

The terms "run," "workout," "performance," "athletic performance," "event," and the like are used herein in various different places. These terms are used interchangeably and should not be considered as limited to any specific type of activity, any specific type of workout, and/or any specific type of environment of use. For example, these terms may be used to describe a workout session, a training session, an actual race or event, a practice session, an individual training session, a coach or trainer monitored training session, and/or any desired type of physical activity, including indoor activities, outdoor activities, gym activities, playground activities, or the like.

CONCLUSION

The various embodiments of the device of the present invention provide enhanced functionality in recording and monitoring athletic performance data. Data can regularly be uploaded to the computer as well as the Remote Site as described herein. In addition, data from the Remote Site can be downloaded to the device wherein the user can take the Remote Site with the user. The housing provides for a robust wearable watch. The housing structure can absorb the shocks and impacts of running such that the controller can operate smoothly. Additionally, the housing structure prevents debris, water, perspiration or other moisture from ingress into the interior of the housing where it could contaminate the controller and adversely affect operability. In one exemplary embodiment, the housing is water-resistant to approximately five atmospheres of pressure. The user interface configuration provides simple and easy operation of the watch, particularly the tri-axis configuration. The user can easily perform functions such as using the shock sensor and, in particular, mark laps by tapping the front face or crystal of the device. With such an easy operation, the user can focus on the athletic performance rather than to locate a proper user input on the watch. The user interface provides many features as described herein to provide enhanced operability of the device.

While the specific embodiments have been illustrated and described, numerous modifications are possible without departing from the spirit of the invention, and the scope of protection is only limited by the scope of the accompanying Claims.

What is claimed is:

1. A system for monitoring an athletic performance, comprising:
    a wrist-borne device, further comprising:
        an input system for receiving: (a) a first type of input data indicative of an athlete's movement distance during an athletic performance over at least a first portion of a route and (b) a second type of input data indicative of the athlete's movement distance during the same athletic performance over at least the first portion of the route, wherein the first type of input data is generated by a first sensor hardware system that is independent from a second sensor hardware system that generates the second type of input data; and
        a processing system programmed and adapted for: (a) determining whether the first type of input data or the second type of input data is likely more accurate for the first portion of the route, using foot contact profile data and (b) determining at least one of overall movement distance during the athletic performance, movement distance over the first portion of the route, overall pace during the athletic performance, or pace over the first portion of the route using the type of input data determined to be more accurate over the first portion of the route.

2. A system according to claim 1, wherein the first type of input data is pedometer data and the second type of input data is GPS data.

3. A system according to claim 2, wherein the first sensor system generates the pedometer data over a second portion of the route during the athletic performance, and wherein the second sensor system generates the GPS data over the second portion of the route during the athletic performance.

4. A system according to claim 3, wherein, in the step of determining at least one of overall movement distance during the athletic performance, movement distance over the first portion of the route, overall pace during the athletic performance, or pace over the first portion of the route, the processing system uses the pedometer data for providing the movement distance over the first portion of the route and the GPS data for providing the movement distance over the second portion of the route.

5. A system according to claim 1, wherein the input system further receives a third type of input data indicative of acceleration changes over at least the first portion of the route.

6. A system according to claim 5, wherein the third type of input data is used by the processing system in determining whether the first type of input data or the second type of input is likely more accurate for the first portion of the route.

7. A system according to claim 1, wherein the first sensor system generates the first type of input data over a second portion of the route during the athletic performance, and wherein the second sensor system generates the second type of input data over the second portion of the route during the athletic performance.

8. A system according to claim 7, wherein, in the step of determining at least one of overall movement distance during the athletic performance, movement distance over the first portion of the route, overall pace during the athletic performance, or pace over the first portion of the route, the processing system uses the first type of input data for providing the movement distance over the first portion of the route and the second type of input data for providing the movement distance over the second portion of the route.

9. A system according to claim 1, wherein the wrist-borne device comprises a watch device.

10. A system according to claim 1, wherein the input system and processing system are included as part of a personal computer device.

11. The system of claim 1, wherein the foot contact profile data includes foot contact pressure data and foot contact angle data.

12. A method for monitoring an athletic performance, comprising:
    receiving input data from a first sensor hardware system indicative of an athlete's movement distance during an athletic performance over a plurality of distance segments of a route;
    receiving input data from a second sensor hardware system indicative of the athlete's movement distance during the same athletic performance over a plurality of distance segments of the route, wherein the first sensor hardware system is independent of the second sensor hardware system, and wherein the first sensor hardware system and the second sensor hardware system generate input data for at least partially overlapping segments of the route;

determining whether the input data from the first sensor hardware system or the input data from the second sensor hardware system is likely more accurate for the segments of the route, using foot contact profile data; and determining at least one of overall movement distance during the athletic performance and overall pace during the athletic performance using the input data determined to likely be more accurate for each segment of the route such that the input data from the first sensor hardware system is used for determining a distance associated with a first portion of the segments and the input data from the second sensor hardware system is used for determining a distance associated with a second portion of the segments.

13. A method according to claim 12, wherein the input data from the first sensor system is pedometer data and the input data from the second sensor system is GPS data.

14. A method according to claim 13, wherein the pedometer data is used at a segment of the route corresponding to a start of the route.

15. A method according to claim 13, wherein the pedometer data is used at segments of the route when GPS data is not available.

16. A method according to claim 12, wherein the input data from the first and second sensor systems are received in a portable electronic device.

17. A method according to claim 12, wherein the input data from the first and second sensor systems are received in a watch device.

18. A method according to claim 12, wherein the input data from the first and second sensor systems are transmitted over a network to a remote computing device.

19. A method according to claim 12, further comprising:
receiving input data indicative of features of foot contact with a surface over at least a portion of the athletic performance.

20. A method according to claim 19, wherein the input data indicative of the features of foot contact with a surface over at least a portion of the athletic performance is used in the determining whether the input data from the first sensor system or the input data from the second sensor system is likely more accurate.

* * * * *